United States Patent
Horvitz et al.

(10) Patent No.: US 7,529,683 B2
(45) Date of Patent: May 5, 2009

(54) PRINCIPALS AND METHODS FOR BALANCING THE TIMELINESS OF COMMUNICATIONS AND INFORMATION DELIVERY WITH THE EXPECTED COST OF INTERRUPTION VIA DEFERRAL POLICIES

(75) Inventors: Eric J. Horvitz, Kirkland, WA (US); Dimitris Achlioptas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 603 days.

(21) Appl. No.: 11/171,868

(22) Filed: Jun. 29, 2005

(65) Prior Publication Data

US 2007/0004385 A1    Jan. 4, 2007

(51) Int. Cl.
*G06Q 10/00*    (2006.01)
(52) U.S. Cl. .......................................... 705/1
(58) Field of Classification Search ........ 705/1
See application file for complete search history.

(56) References Cited

U.S. PATENT DOCUMENTS

| | | | |
|---|---|---|---|
| 5,493,692 | A | 2/1996 | Theimer et al. |
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,812,865 | A | 9/1998 | Theimer et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |

(Continued)

FOREIGN PATENT DOCUMENTS

WO    9800787    1/1998

OTHER PUBLICATIONS

Hafner, Katie, "Software Designers Take On Distractions The Goal Is to Minimize Interruptions But First, Let Me Check My E-Mail," International Herald Tribune, 3 Edition, Paris, Feb. 12, 2005, p. 16.*

(Continued)

*Primary Examiner*—John W Hayes
*Assistant Examiner*—Nathan Erb
(74) *Attorney, Agent, or Firm*—Amin, Turocy & Calvin, LLP

(57) ABSTRACT

A system is provided that facilitates information processing for a user. The system includes an analyzer to automatically determine one or more states of a user's availability based on patterns of the user's interruptability. A deferral component generates or forwards messages or alerts to the user in accordance with a cost-minimization analysis and determined availability. For example, the deferral component can process interrupts to the user and determine at least one of optimal and approximately optimal deferral times in which to direct an information item to the user, the information item being one of an email message, an incoming phone call, a push-to-talk message, an instant message, an alert, requests, offers of assistance, status or error reports, or a task from another application or autonomous system.

15 Claims, 18 Drawing Sheets

BOUNDED-DEFERRAL POLICY

- WAIT FOR A "USER AVAILABLE STATE" UNLESS HIT TIME BOUND, THEN DISRUPT

- LIST OF BUSY / AVAILABLE STATES PER CONTEXT

- URGENCY-SENSITIVE TIME BOUNDS
  T(HIGH) = T1 < T(MED) = T2 < T(LOW) = T3

- BOUNDS CAN DEPEND ON CONTEXT (E.G., WORKLOAD), NUMBER OF MESSAGES RECEVIED, ETC.

U.S. PATENT DOCUMENTS

| | | | |
|---|---|---|---|
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2003/0212646 | A1* | 11/2003 | Horvitz ....................... 706/46 |
| 2004/0003042 | A1* | 1/2004 | Horvitz et al. .............. 709/204 |
| 2004/0030753 | A1* | 2/2004 | Horvitz ...................... 709/206 |
| 2005/0034078 | A1 | 2/2005 | Abbott et al. |

OTHER PUBLICATIONS

E. Cutrell, et al. Notification, Disruption and Memory: Effects of Messaging Interruptions on Memory and Performance. In Human-Computer Interaction—Interact '01, 2001., pp. 263-269, 2001.

M. Czerwinski, et al. Instant Messaging and Interruption: Influence of Task Type on Performance. In Proceedings of OZCHI 2000 of OZCHI 2000, pp. 99-100, 2000.

T. Gillie, et al. What Makes Interruptions Disruptive? A Study of Length, Similarity, and Complexity. Psychological Research, 50:243-250, 1989.

E. Horvitz, et al. Attention-Sensitve Alerting. In Proceedings of the Fifteenth Conference on Uncertainty in Artificial Intelligence, pp. 305-313. AUAI, Morgan Kaufmann, Aug. 1999.

E. Horvitz, et al. Models of Attention in Computing and Communication: From Principles to Applications. Communications of the ACM, 46(3), 2003.

E. Horvitz, et al. Learning and Reasoning about Interruption. In Proceedings of the 5th International Conference on Multimodal Interfaces, pp. 20-27, 2003.

E. Horvitz, et al. Busybody: Creating and Fielding Personalized Models of the Cost of Interruption. In Proceedings of the ACM Conference on Computer Supported Cooperative Work (CSCW '04), pp. 20-27, 2004.

S. Hudson, et al. Predicting Human Interruptibility with Sensors: A Wizard of Oz Feasibility Study. In Proceedings of CHI 2003, pp. 207-214, 2003.

D.C. McFarlane. Coordinating the Interruption of People in Human-Computer Interaction. In Human Computer Interaction—Interact '99, pp. 295-303. IOS Press, Inc., 1999.

D.C. McFarlane. Comparison of Four Primary Methods for Coordinating the Interruption of People in Human-Computer Interaction. Human-Computer Interation, 17(1): 63-139, 2002.

L. Bannon, et al. Evaluation and Analysis of User's Activity Organization. In Proceedings of CHI '83, pp. 54-57, 1983.

M. Czerwinski, et al. A Diary Stude of Task Switching and Interruptions. In Proceedings of CHI 2004., pp. 175-182, 2004.

S. Dumais, et al. Inductive Learning Algorithms and Representations for Text Proceedings of the Seventh International Conference on Information and knowledge Management. Association fo rComputing Machinery, ACM Press, New York, pp. 148-155, 1998.

J. Fogarty, et al. Examining the Robustness of Sensor-Based Statistical Models of Human Interruptability. Proceedings of CHI 2004, 2004.

E. Horvitz, et al. Coordinate: Probabilistic Forecasting of Presence and Availability. Proceeding of UAI '02, Proceedings of the Eighteenth Conference on Uncertainty and Artifical Intelligence, pp. 224-233, 2002.

E. Horvitz, et al. Models of Attention in Computing and Communications: From Principles to Applications, Communications of the ACM 46(3):52-59, Mar. 2003.

J.M. Hudson, et al. I'd be Overwhelmed But it's Just One More Thing to Do, Availability and Interruption in Research Management. Proceedings of CHI 2002, pp. 97-104, 2002.

V. Kaptelinin. UMEA: User-Monitoring Environment for Activites. In Proeceedings of UIST '02 Companion, pp. 31-32, 2002.

B. MacIntyre, et al. Support for Multitasking and Background Awareness Usint Interactive Peripheral Displays. In Proceedings of UIST 2001, pp. 41-50, 2001.

D.S. McCrickard, et al. Establishing Tradeoffs that Leverage Attention for Utility: Empirically Evaluating Information Display in Notification Systems. International Journal of Human-Computer Studies, 2003.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminating Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

\* cited by examiner

PRINCIPALS AND METHODS FOR BALANCING THE TIMELINESS OF COMMUNICATIONS AND INFORMATION DELIVERY WITH THE EXPECTED COST OF INTERRUPTION VIA DEFERRAL POLICIES

BACKGROUND

In modern computing environments and work settings, users are able to perform an ever increasing amount of tasks. From working in multiple computer applications in a concurrent manner and responding to incoming communications such as phones, emails, instant messages and so forth, users are faced with a number of time-demands in order to satisfy external entities while also completing the task at hand. In a typical desktop scenario, a user may be typing in a word processing application, completing a presentation application for an upcoming meeting, filling out a spreadsheet regarding project needs, and completing items in a task scheduler to indicate project milestones and activities. At the same time calls and emails may bid for the user's attention which adds to the complexity of completing existing activities on time. In some cases, users may ignore incoming messages in order to complete what is perceived to be higher priority tasks.

Although deferring messages or other requests for the user's attention may allow users to complete current work while avoiding interruption, this may not be in the user's best interest. For example, an urgent message from a supervisor indicating that a new task should begin immediately while delaying a current task would provide a new priority framework in which the user should be made aware of as soon as possible. Alternatively, if users are constantly interrupted with requests for their attention outside the task at hand, productivity can suffer when concentration is continually broken to focus on each distraction that may occur outside of the given task. Thus, modern workers are often challenged to strike a balance between focusing on important activities that need to be completed for productivity purposes at the same time trying to process interruptions that may have high urgency requiring the user's immediate attention.

SUMMARY

The following presents a simplified summary of the claimed subject matter in order to provide a basic understanding of some aspects described herein. This summary is not an extensive overview of the claimed subject matter, and is not intended to identify key/critical elements or to delineate the scope of such matter. Its sole purpose is to present some concepts in a simplified form as a prelude to the more detailed description that is presented later.

The claimed subject matter relates to systems and methods for determining deferral times with respect to delivering alerts to a user given user state and a predicted time from which the user will transition from the state (e.g., from a state where the user is categorized as busy to a state where the user is categorized as available). For instance, an analyzer can model a user's states over time in connection with determining a deferral time within a calculated bound in which to deliver an interruption. Various models can be constructed for deferring an alert or other attention item to the user's focus of attention. For example, if it is determined that the user is in a high state of busyness and/or an alert is determined to be of lower priority, then an alert such as a message to the user can be subject to a bounded deferred time based at least in part upon a predicted instance in time that the user's state will alter (e.g., busy to available). In more detail, an individual who is too busy to review a message or information update when it arrives will likely transition to an "available" state in time, which can be described by a learned probability distribution. A deferral component can be employed to receive output from the models to direct the alert to the user's attention within a bounded deferral limit (e.g., delay a phone message based at least in part upon a predicted amount of time between user states). Moreover, an alert can be provided to a user upon a sensed change in a user's state.

The above models allow users to process current information without requiring the user to pay full attention to any particular alert that may be available but can be processed more efficiently at a later time. The models can determine probabilities associated with lack of user availability (e.g., the user is substantially busy) given user history, user context, and the like. Further, the models can generate a measure of importance with respect to information type in an alert (e.g., email, weather, traffic, voice, and so forth) in view of considered properties such as the user's current activities, time of day, urgency or priority of the message, and so forth. The analyzer can be coupled with alerting and cost models for when to engage a user with considerations of the user's current workload, for example. Decision-theoretic principles can also be applied to weigh the cost of interrupting the user versus the benefits of notifying the user at a given time and from a detected change in the user's state. Also, bounded deferral policies can be applied by the analyzer to resolve notifying users from competing alerts that may be potential or possible candidates for gaining the user's present or near term attention.

The claimed subject matter further relates to systems and methods that perform a statistical analysis of time between a user being in a state of high cost of interruption and when the user transitions to a state of lower cost of interruption or becomes available. An approach to identifying an ideal maximal deferral time is also defined. Mathematical expressions are introduced for identifying a maximal deferral time via minimization of expected cost, taking into consideration the loss of value with delays and the cost of interruption under uncertainty. The formulation can drive the automated identification of maximal times for deferring the alerting of people while their attention is allocated elsewhere about items such as pending calls, utterances in push-to-talk communication systems, alerts, tasks, and messages, such as email and instant messaging, for example.

To the accomplishment of the foregoing and related ends, certain illustrative aspects of the claimed subject matter are described herein in connection with the following description and the annexed drawings. These aspects are indicative of various ways in which the claimed subject matter may be practiced, all of which are intended to be covered. Other advantages and novel features may become apparent from the following detailed description when considered in conjunction with the drawings.

DETAILED DESCRIPTION

The claimed subject matter relates to systems and methods that perform a statistical analysis of the time between a user being in a high cost of interruption and when they are available. Based upon this analysis, optimal wait times are automatically determined for deferring items for a user's attention such as pending calls, alerts, messages, and tasks, for example. In one aspect, a system is provided that facilitates information processing of a user. The system includes an analyzer to automatically determine one or more states of a user's availability based on patterns of the user's interruptability. A deferral component generates alerts to the user in accordance with the determined availability.

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Figure 1:
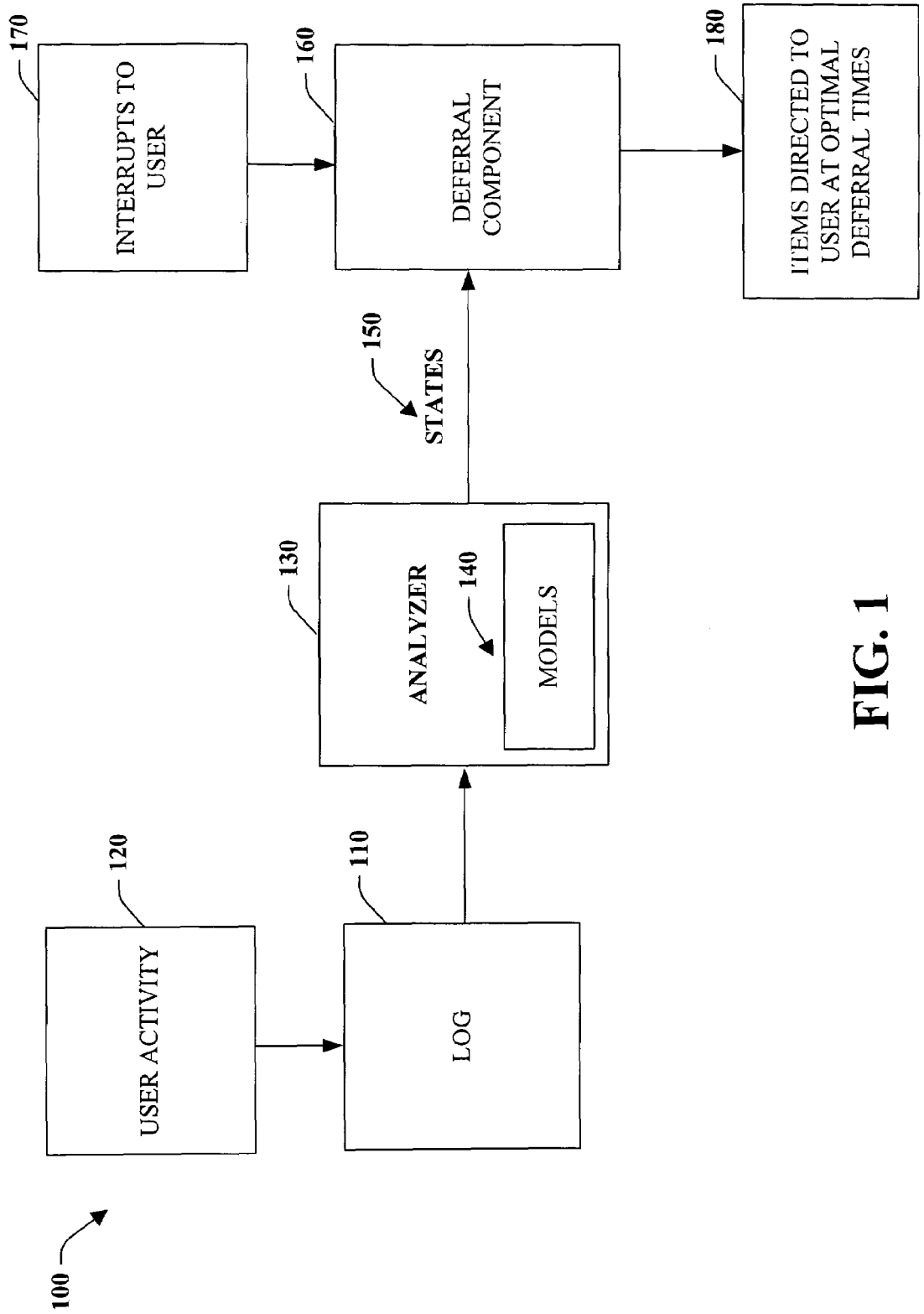
FIG. 1 is a schematic block diagram illustrating an item deferral system.

Referring initially to FIG. 1, a notification deferral system 100 is illustrated. The system 100 includes a log 110 that records user activity 120 over time, wherein the log 110 can record data from local and or remote network locations. These patterns include determining availability, unavailability, busyness, activity, and so forth that reflect differing states of a user (e.g., states of interruptability). For instance, by monitoring activities over time (e.g., applications, subject matter being worked on, type or numbers of tasks, times of busyness, times when email or voice mail are processed), it can be determined when it would be of high cost to interrupt the user versus when a lower cost is associated with interruption of a user (e.g., disparate states of interruptability). For example, high cost can refer to interrupting the user when they are highly focused on another task versus a lower cost period when the user is free to process alert information.

An analyzer 130 process data from the log 110 via one or more models 140 that are employed to determine or predict user busyness states 150 such as when it would be of lower cost to interrupt the user versus periods of higher cost when the user is focused on other tasks. Furthermore, data from the log 110 can be analyzed to predict a transition between user states (e.g., states of busyness), wherein the transition can be defined disparate assessed costs of interruption (e.g., costs of interrupting a user given a particular user state). In accordance with one aspect, states of interruption can be defined as high, medium, and low cost, respectively. Other more or less granular states can also be defined, are contemplated by the inventor, and are intended to fall under the scope of the hereto-appended claims. By monitoring the user activity 120, a time that a user will transition into a lower cost state can be predicted, and such prediction can be utilized to determine a period of time that a message, alert, or other interruption is to be deferred.

In more detail, a deferral component 160 processes interrupts 170 to the user and determines a bounded deferral time in which to direct items 180 to the user in accordance with the determined states 150. The items 180 can include substantially any type of information that may be directed to a user such as email, phone messages, instant messages, calendar alerts or alerts in general, tasks from other applications and so forth. The bounded deferral time can be determined by analyzing cost of delaying receipt of information to the user together with cost of interrupting the user. As alluded to above, the models 140 associated with the analyzer 130 can be employed in connection with calculating such costs as well as calculating a predicted time and/or a probability that a user will transition to a lower cost state within a threshold time. For instance, the analyzer 130 can couple alerting and cost models (within the models 140) for when to engage a user from a particular interrupt with considerations of the user's current workload. Decision-theoretic principles can also be applied to weigh the cost of interrupting the user versus the benefits of notifying the user at a given time. Also, bounded deferral policies can be applied by the analyzer 130 to resolve notifying users from interrupts 180 that may be potential or possible candidates for gaining the user's present or near term attention.

As can be appreciated, the analyzer 130 can monitor the log 110 of the user's activities over time to build or train models 140 that are then employed to determine a deferral time for messages and other interrupts at 180. For instance, the models 140 can learn patterns such as the user's interests, the user's attention modes at given times, the user's preference for a particular type message over another type, and substantially any information that can be gleaned from the log 110 that indicates preferences of the user for processing information at given times. The models 140 can include substantially any type of system such as statistical/mathematical models and processes for modeling users and determining preferences and interests including the use of Bayesian learning, which can generate Bayesian dependency models, such as Bayesian networks, naïve Bayesian classifiers, and/or Support Vector Machines (SVMs), for example. Other type models or systems can include neural networks and Hidden Markov Models, for example. Although elaborate reasoning models can be employed in accordance with the claimed subject matter, it is to be appreciated that other approaches can also utilized. For example, rather than a more thorough probabilistic approach, deterministic assumptions can also be employed (e.g., no current application activity for X amount of time may imply by rule that user is in a lower busyness state). Thus, in addition to reasoning under uncertainty, logical decisions can also be made regarding the status, location, context, interests, focus, and so forth of the users.

The models 140 can be constructed and/or trained from the log 110 that collects or aggregates data from a plurality of different data sources. Such sources can include various data acquisition components that record or log user event data (e.g., cell phone, acoustical activity recorded by microphone, Global Positioning System (GPS), electronic calendar, vision monitoring equipment, desktop activity, web site interaction and so forth). It is noted that the system 100 can be implemented in substantially any manner that supports personalized information processing. For example, the system could be implemented as a server, a server farm, within client application(s), or more generalized to include a web service(s) or other automated application(s) that interact with local or remote sessions.

In operation, the system 100 is utilized to balance cost of delaying deliverance of a notification to a user versus cost of interrupting the user given the user's current state in order to determine a deferral policy with respect to the notification specifically, and the user generally. The models 140 associated with the analyzer 130 can, based at least in part upon data within the log 110, generate a context-sensitive probability distribution over the user's transition from unavailable to available states. The analyzer 130 and/or the deferral component 160 can also compute a measure of loss with respect to delaying the incoming notification and/or underlying message. For example, this loss of value of reviewing an incoming message or alert at increasing times t after arrival of such message or alert can be labeled as $f(t)$, and a cost of interruption of alerting the user when the user is in a busy/unavailable state can be labeled as c. A probability that the user is available for interruption after time t can be defined in the following algorithm:

$p(t)=1-g(t)$, where g: $[0,\infty) \rightarrow [0,1]]$ is an arbitrary non-increasing function.

The time-dependent loss of value of information in an incoming message f(t), and the probability distribution, p(t) can be considered by the deferral component 160 when determining a bounded deferral period. An optimal deferral t* is a time that minimizes overall expected cost to a user, including expected cost of disruption and loss with delayed review of message information under uncertainty. Total cost output by the analyzer 130 (by way of the models 140) can include at least two cases: (1) a case where a user remains busy up to a deferral bound; and (2) a case where a user becomes free at a time t before the deferral bound. For the first case, contributions to total expected cost of losses from disruption of being alerted when busing can be considered in addition to delay. In the second case, only a cost of delay until a transition to a free state contributes to total expected costs.

The analyzer 130 can compute the total expected cost associated with selected deferral time by way of combining the influence of the above two cases. Thus, a total cost W(t) can be defined as:

$$W(t)=(c+f(t))g(t)+\int_0^t -g'(s)f(s)ds$$

where W(t) is the total expected cost associated with the handling of a message that arrives when a user is busy; g(t) describes the probability that a user will be busy after waiting up until the maximal deferral time t; $f(t)$ is the loss in the value of seeing a message or alert, relative to the initial value of reviewing a message when it arrives, when reviewing the message at the maximal deferral time; $f(s)$ is the loss of value of the message at times s that a user might become available before the maximal deferral under uncertainty; and c is the cost of interruption if the user is busy.

A global maximum can be obtained by way of a derivative, W'(t):

$$W'(t)=f'(t)g(t)+cg'(t) \quad (1)$$

Given an instantiation of (1) with concrete functions $f$ and g, T can be defined as equal to $\{t_0, t_1, \ldots\}$, which is the set of all t such that W'(t)=0 and W''(t)<0. An expected total cost W can then be minimized for some $t \in \{0,T,\infty\}$, for example, by one of the following policies: i) not waiting at all (immediate notification), ii) waiting until a time $t \in T$ that minimizes W, or iii) waiting until a user is available without regard to an amount of time required.

For general functions $f$ and g, the following algorithm is desirably solved:

$$W'(t) = 0 \Leftrightarrow f'(t) = -c\frac{g'(t)}{g(t)}, \quad (2)$$

For instance, a family of functions can be considered that represent the probability that a user is still busy after time t has passed, $g(t)=\exp(-h(t))$, where $h(t)=\lambda t$. For an arbitrarily increasing function, algorithm (2) can be rewritten as:

$$W'(t)=0 \Leftrightarrow f'(t)=ch'(t).$$

Accordingly, analysis of deferral times associated with minimum cost relates to a number of times that f' and h' intersect.

With respect to classes of deferral problems captured by the algorithm (2), a probability that a user is free after time t can be defined as:

$$p(t)=1-e^{-\lambda t},$$

where a cost of interruption is a constant c. A total expected cost of waiting until time t prior to interrupting a user can then be defined as:

$$W(t)=(c+f(t))e^{-\lambda t}+\int_0^t \lambda e^{\lambda s}f(s)ds,$$

and $$W'(t)=e^{-\lambda t}(f'(t)-\lambda c).$$

Therefore, it can be determined that if $t_0>0$ is to be an optimal deferral bound, then $$f'(t_0)=\lambda c,$$

and $$f''(t_0)>0,$$

thus ensuring that $f(t_0)$ is a minimum.

It can further be assumed that cost associated with a delayed receipt of information, $f(t)$, behave as a sigmoid. This can be modeled by defining $f'$ as a unimodal function associated with a unique maximum. By overlaying a horizontal line $g(t)=\lambda c$ with a plot of $f'(t)$, it can be ascertained that the following equation can have at most two disparate solutions:

$$W'(t)=0 \Leftrightarrow f'(t)=\lambda c.$$

Given this information, cases can be distinguished. In a first case, where $f'(t)<\lambda c$ for all t, then $W'(t)<0$ for all t. In this case, the deferral component 160 can determine that the user should not be interrupted until the user transitions to a lower state, unless $f$ increases slowly, but there exists some time around which $f$ increases dramatically. In such an instance, it would not be desirable to wait until the point of rapid increase. In the second case, where $f'(t)=\lambda c$ at a unique point $t_0$, then $t_0$ is not a local minimum of W since $W'(t)<0$ for all $t\neq t_0$. In this case, like the first case, the deferral component 160 can determine that the user is not to be interrupted with the notification/message until the user transitions to a state where they are available. In a third case, when $t_0$ and $t_1$ are two points where $f'(t)=\lambda c$, then $t_0$ is a local minimum and $t_1$ is a local maximum. The deferral component 160 can determine whether $t_0$ is a global minimum by ensuring that the expected cost of waiting to deliver a message at $t_0$ is less than an expected cost of waiting forever. More particularly, to ensure the expected cost is less than an expected cost of waiting forever, the deferral component 160 can check whether $$W(t_0) < \lim_{t\to\infty} W(t) \quad (3)$$

$$= \int_0^\infty \lambda e^{-\lambda s} f(s) ds \quad (4)$$

Thus, to determine a bounded deferral time for which to deliver a message to a user who is in a state associated with unavailability (e.g., the user is busy), the equation $$f'(t)=\lambda c$$

can be solved (for instance, by the analyzer 130). If the equation has fewer than two roots, then the deferral component 160 can prevent a user from being interrupted with an at-issue message until the user transitions to a disparate state associated with increased availability. Otherwise, if $t_0$ and $t_1$ are the roots, the analyzer 130 can determine a cost of unbounded delay $$W_\infty = \int_0^\infty \lambda e^{-\lambda s} f(s) ds,$$

and compare the cost to a cost associated with the root to (e.g., the cost of interrupting the user given a probability that the user will transition to a disparate state). If the cost of unbounded delay is less than the cost associated with the root $t_0$, then the user will not be interrupted until it is determined that the user has transitioned to a disparate state (e.g., a state associated with user availability). If the cost of unbounded delay is greater than the cost associated with the root $t_0$, then an interruption can be delivered to the user at time $t_0$. Furthermore, it is understood that multiple roots can exist in some instances, and that all such roots should be analyzed in determining cost of delaying deliverance of a message.

In accordance with one aspect, the analyzer 130 and models 140 therein can monitor states and calculate the aforementioned costs, and the deferral component 160 can analyze such costs to determine a deferral time associated with an incoming message. The analyzer 130 can also monitor user states and deliver a message prior to the bounded deferral period if the analyzer 130 determines that the user has transitioned from a busy state to an available state. Such determination can be made based upon explicit actions (e.g., altering a profile from "busy" to "available"), learned actions (e.g., opening a web browser and reviewing a non-work related website), or any other suitable manner for determining user states and transitions therebetween. Otherwise, the deferral component 160 can cause deliverance of a notification/message to the user at the expiration of the deferral period.

Figure 2:
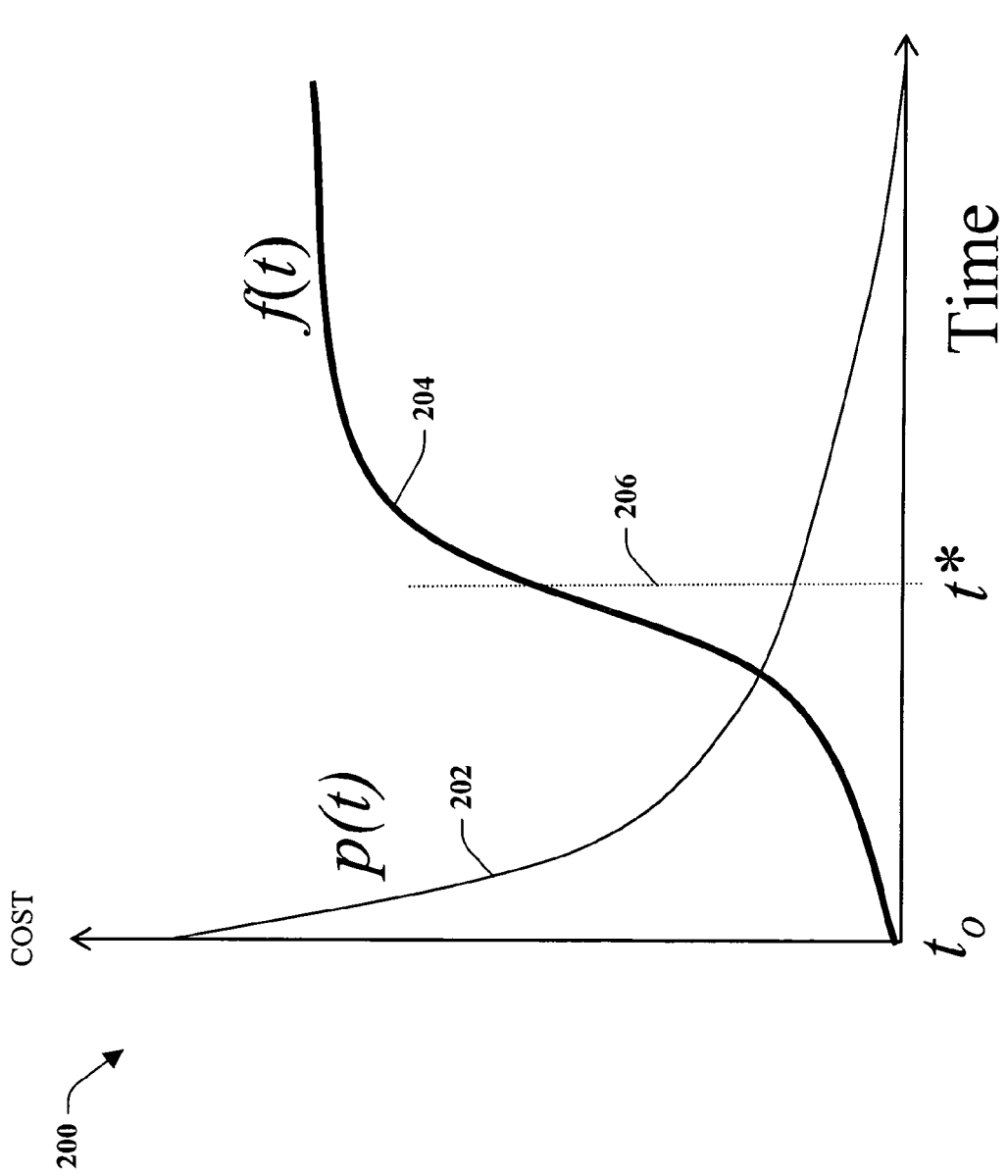
FIG. 2 is a graph illustrating relationships that can be utilized to determine a bounded deferral time.

Turning now to FIG. 2, a graph 200 depicting relationships that can be utilized to determine a bounded deferral time is illustrated. A probability distribution (p(t)) 202 describes a likelihood that a user will remain busy given an increasing amount of time after a message arrives. The probability distribution 202 can be learned over time by the analyzer 130 (and models 140 therein) by analyzing the log 110 (FIG. 1). For example, the analyzer 130 can be subject to a training phase, wherein empirical data is provided to such analyzer 130. Furthermore, the analyzer 130 can be continuously updated and/or modified based upon user actions. The graph 200 further includes a cost function (f(t)) 204 that can be assessed from user actions/responses and can vary based upon message type. The cost function 204 can also be learned by the analyzer 130, and can capture loss in value of reviewing contents of information over time. For example, value of traffic information is associated with time of receipt of such message (value decreases as time goes on, thus increasing cost of delay). If a cost of interruption is introduced, which can vary by context, a tradeoff between the probability distribution 202 and the cost function 204 can be computed, and an optimal deferral time t* 206 can be determined for any suitable message and context. The optimal time 206 is a time at which an alert is provided to the user and the cost of interruption is incurred. It is understood, however, that if the user transitions to a free state before the deferral bound, the message can be passed at that time.

Figure 3:
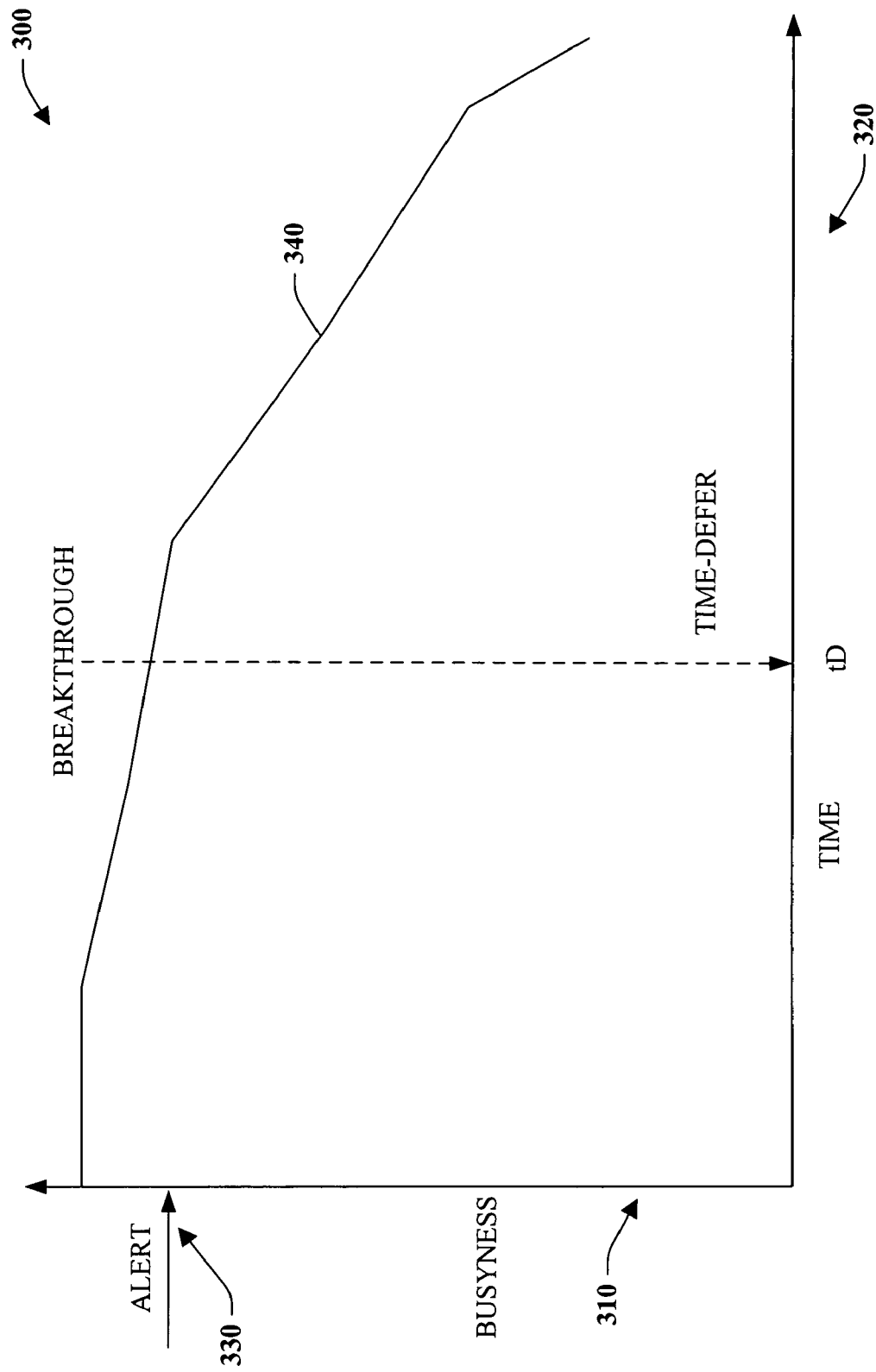
FIG. 3 is a diagram illustrating directing an item to a user's attention at an optimal deferral time in view of a busyness state of the user.

Now referring to FIG. 3, a diagram 300 illustrating direction of an item to a user's attention at an optimal deferral time in view of a busyness state of the user is illustrated. Along a Y axis 310 a user busyness state is reflected, wherein higher states of busyness relating to higher costs of interruption appear higher on the axis. Along an X axis 320, time is shown that increases from time =0 on the left and aligned with an incoming alert 330 and increasing thereafter. The analyzer and models described above determine/predict the various busyness states of a user depicted on the example line 340. In conjunction with the deferral component described above, an optimal deferral period is determined whereby a balance is struck between interrupting the user at any given busyness state and weighing the value of the information contained in the alert 330 as it degrades over time. When these constraints have been considered, a break-through message or alert is sent to the user which represents how long the alert 330 has been delayed in view of the user's current state of busyness or non-interruptability and thus presents providing the item at a substantially optimal period for the user. As noted above, the above models and components allow users to process current information without requiring the user to pay full attention to any particular alert that may be available but can be processed more efficiently at a later time. The models can determine probabilities of when the user is not free given evidence of time to defer in order to determine optimum deferral times for an alert. This can include an analysis of the information type in an alert (e.g., email, weather, traffic, voice, personal, business-related, topic, and so forth) in view of considered properties such as the user's current activities, time of day, urgency or priority of the message, and so forth.

Figure 4:
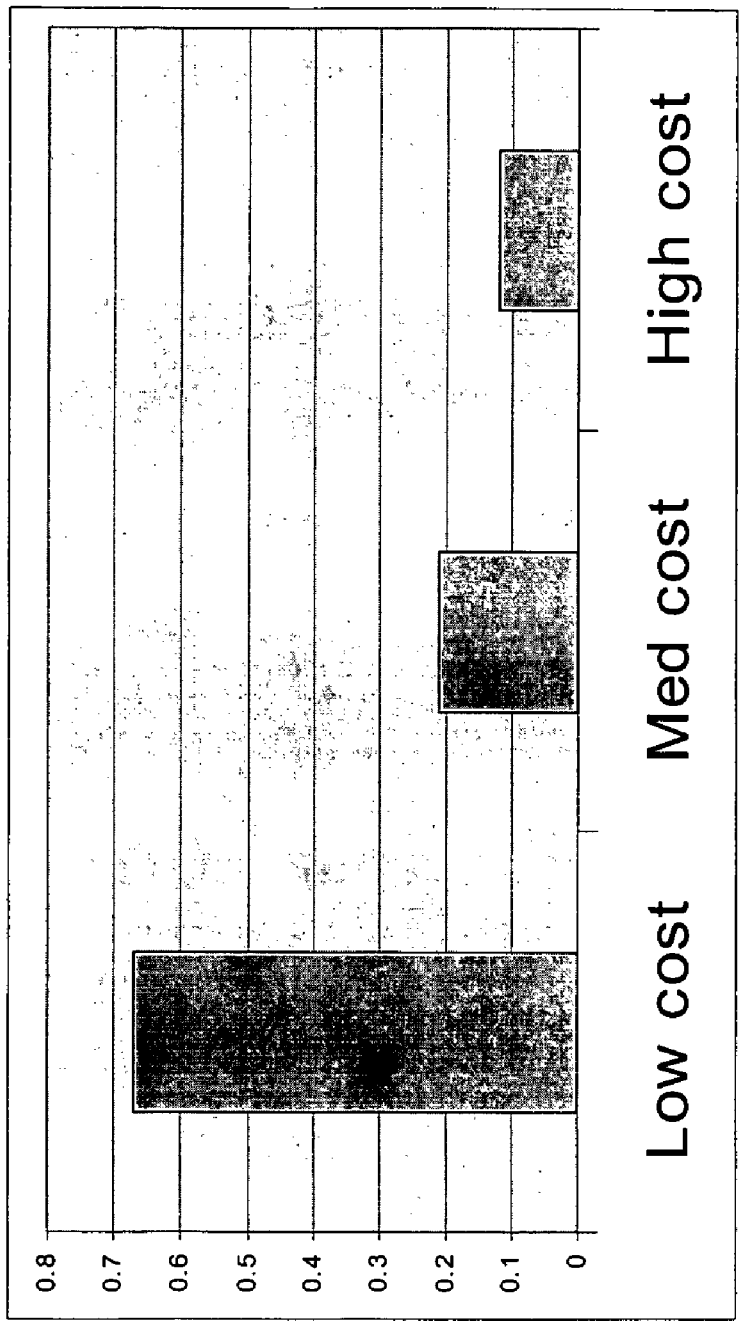
FIGS. 4-6 illustrate data for constructing models.
Figure 5:
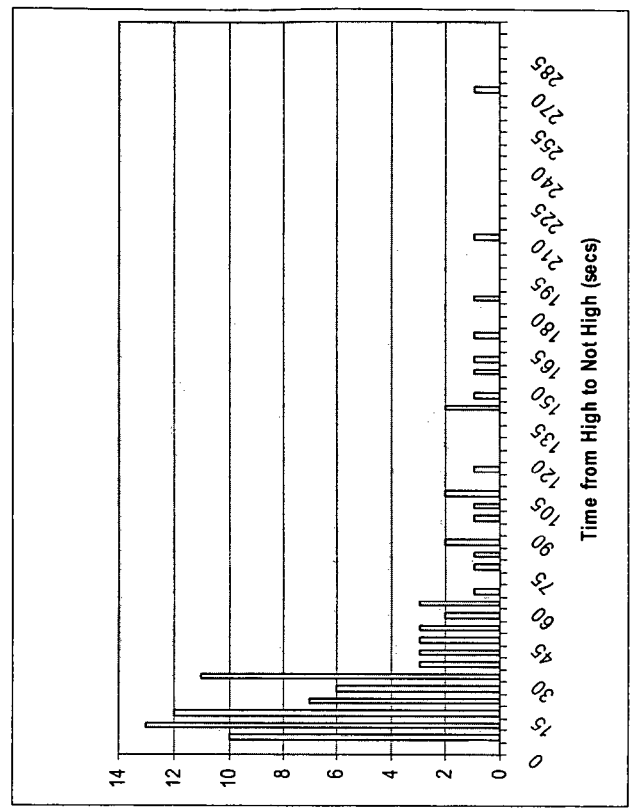
Figure 5:
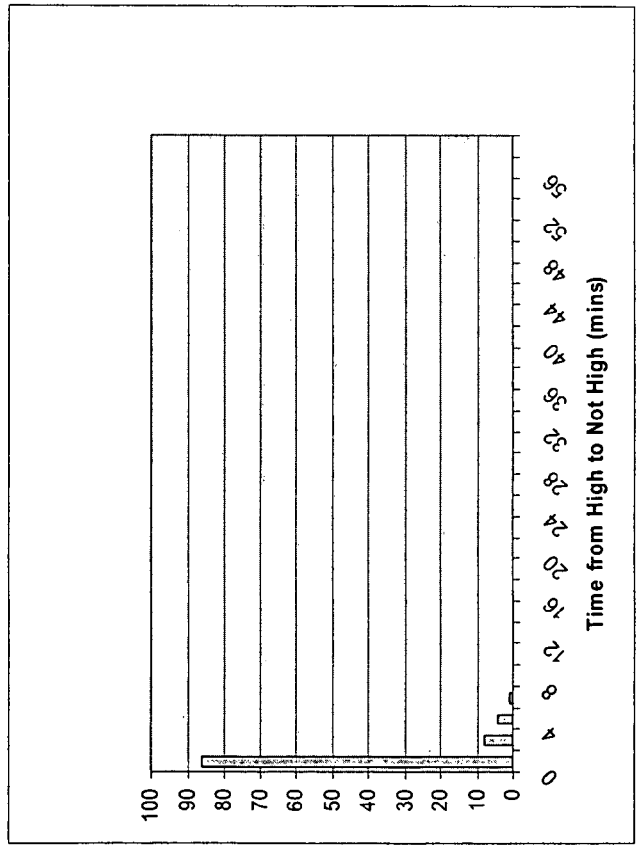
Figure 6:
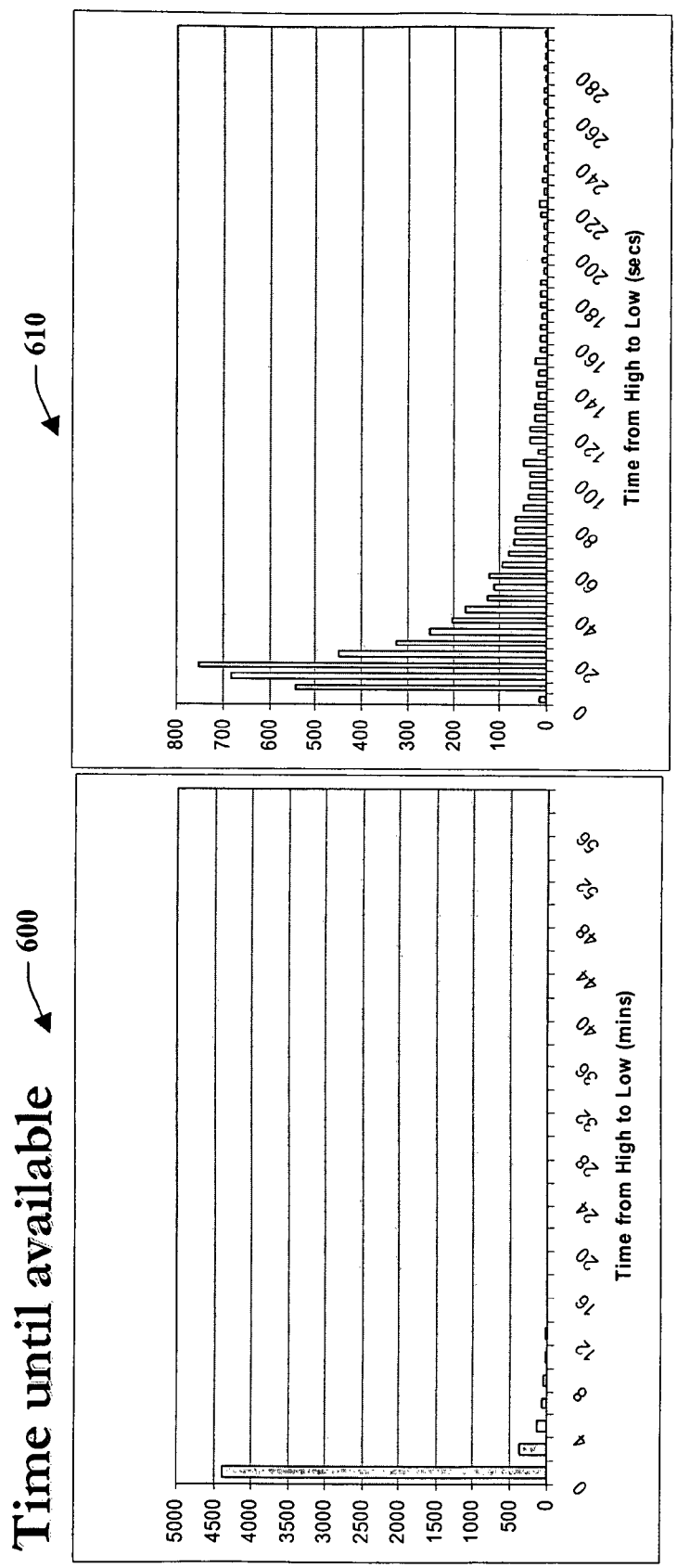

FIGS. 4-6 illustrate example data for constructing models that can be utilized to determine deferral times. At FIG. 4, a diagram 400 illustrates a cost of interruption distribution of a log of messages that are categorized as low cost, medium cost and high cost. As illustrated in this example, about 70% of the messages are of low cost, 20% are at medium cost and about 10% at high cost. As can be appreciated, other categorizations for interrupts are possible (e.g., medium-high, medium-low). FIG. 5 is a diagram 500 illustrating time until available data for a single user. This example data shows that from 0 to 8 about 8 minutes, that the user is likely to be in a state from high cost of interruption to a state that is low or not as high in terms of interruption costs. At 510, the time until available is represented in terms of meetings with a respective user. FIG. 6 represents aggregate data for all participants in a meeting at 600 and 610 representing when the collective participants from the meeting will become available.

Figure 7:
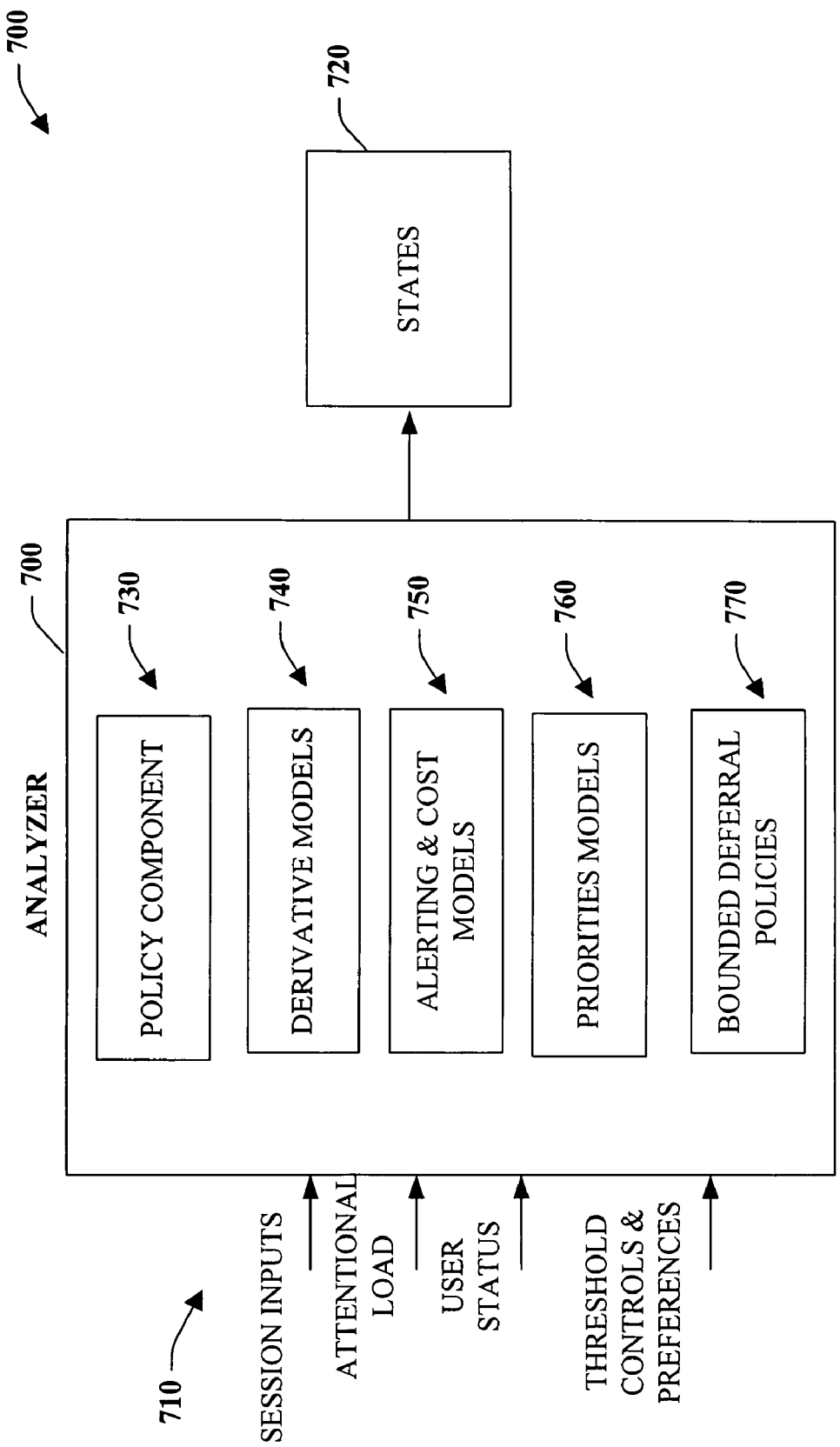
FIG. 7 illustrates an example analyzer.

Referring to FIG. 7, an analyzer 700 for automatically deferring items is illustrated. The analyzer 700 can consider information or data from a plurality of sources or inputs 710 when determining user states 720 in which to optimally deliver respective items. These sources 710 can include data or inputs from one or more application sessions, considerations of the user's attentional load, the user's status (explicitly or implicitly determined) (e.g., I am busy, or reading email), and can include inputs, preferences or threshold settings for specifying/detecting when notifications or alerts should be provided. For instance, the analyzer 700 may include control components that monitor communications parameters for predetermined levels. If a parameter exceeds the predetermined level, the analyzer 700 can activate or notify the user of the detected change at 720 (e.g., if the urgency of words in a message is detected to be greater than X level as the threshold, then notify the user at an earlier time).

Generally, the analyzer 700 supplies/processes a set of abstractions for users with respect to being alerted about communications items. The analyzer 700 can include a policy component 730, which determines rule-based policies, such as for example:
Alert user when:
  Message priority increases
  Value of information in message would be of limited utility if delayed longer
  User's current busyness state changes
  Message Activity overall increases
  Topic or sender of message changes More powerful approaches employ statistical classifiers, for example taking as input dynamics of conversation, including rates, numbers of participants, and content being discussed. Alerting thresholds can be made a function of the workload of users, including the use of inferences about the attention load of users, policies that specify busyness, and such functions as the number of applications being managed and alerting from other sources.

Further, one or more derivative models 740 may be employed by the analyzer 700 for detecting changes in information items or busyness states (e.g., models that apply $1^{st}$ order derivatives to detect change or calculate data changes over time). These can include monitoring various sites or applications for data such as the change in number of words, the change in users, change in content or topic, and so forth. If a change exceeds a parameter change threshold for instance, the busyness state 720 can be changed.

One or more alerting and/or cost models 750 can also be utilized when determining when/how to notify users. This can include a determination of when to alert the user of a high-priority text, for example, a text that has a likelihood of being high priority greater than a user-set threshold, or greater than a threshold determined by decision-theoretic reasoning. That is, beyond knowing about time-critical messages, it can also be important to decide when to alert a user to time-critical messages if the user is not directly viewing incoming sessions, for example. In general, a cost of distracting the user from the current task being addressed to learn about the time-critical message is determined.

Alternatively, various alerting policies for alerting and notification can be employed. These policies can be implemented within a notification platform architecture, for example, that is described in more detail below. These policies can include setting a user-specified upper bound on the total loss. This policy would specify that a system should generate an alert when the total loss associated with the delayed review of a message exceeds some pre-specified "tolerable" loss "x". Another policy can be a cost-benefit analysis based on more complete decision-theoretic analysis, such as NEVA=EVTA−ECA−TC, wherein NEVA is the net expected value of alerting, EVTA is the expected value of alerting, ECA is the expected cost of alerting, and TC is the transmission cost associated with communicating a message.

In general, a user should be alerted when a cost-benefit analysis suggests that the expected loss the user would incur in not reviewing the message or session at time t is greater than the expected cost of alerting the user. That is, alerting should be conducted if:

$$EL-EC>0$$

wherein EL is the expected loss of non-review of the text at a current time t, and EC is the expected cost of alerting the user of the text at the current time t.

Information from several sessions can be grouped together into a single compound alert. It is also useful to know how busy the user is in making decisions about interrupting the user with information about sessions with high time criticality. It can be reasoned (e.g., inferential decision-making) about whether and the rate at which a user is working on a computer, or whether the user is on the telephone, speaking with someone, or at a meeting at another location. Several classes of evidence can be employed to assess a user's activity or his or her focus of attention. A Bayesian network can then be utilized for performing an inference about a user's activity.

Alternatively, decisions as to when and how to alert users can be made by employment of a set of user-specified thresholds and parameters defining policies on alerting. User presence can be inferred based on mouse or keyboard activity, for example. Thus, a user can be enabled to input thresholds on alerting for inferred states of activity and non-activity, for example. Users can also input an amount of idle activity following activity wherein alerting will occur at lower criticalities. If it is determined that the user is not available based on the time that substantially no computer activity is detected, then messages can be stored, and are reported to the user in order of criticality when the user returns to interact with the computer. Furthermore, users can specify routing and paging options as a function of quantities including expected criticality, maximum expected loss, and value of alerting the user.

The analyzer 700 can also include other components or analyzers for determining how and when to notify users of given session activity at optimal deferral periods. For instance this can include priorities model(s) 760 for resolving different items of importance, wherein such systems are described in more detail below with respect to FIG. 8. One or more bounded deferral policies 770 may be employed to resolve differences of when to notify users of particular items or interrupts. For instance, one detection may indicate that items of medium priority have been detected whereas another detection may indicate that items of high priorities have been detected. The bounded deferral policies are then employed to determine which items and at what time they should be exposed to the user. Such deferral policies are described in more detail with respect to FIG. 8 below.

Figure 8:
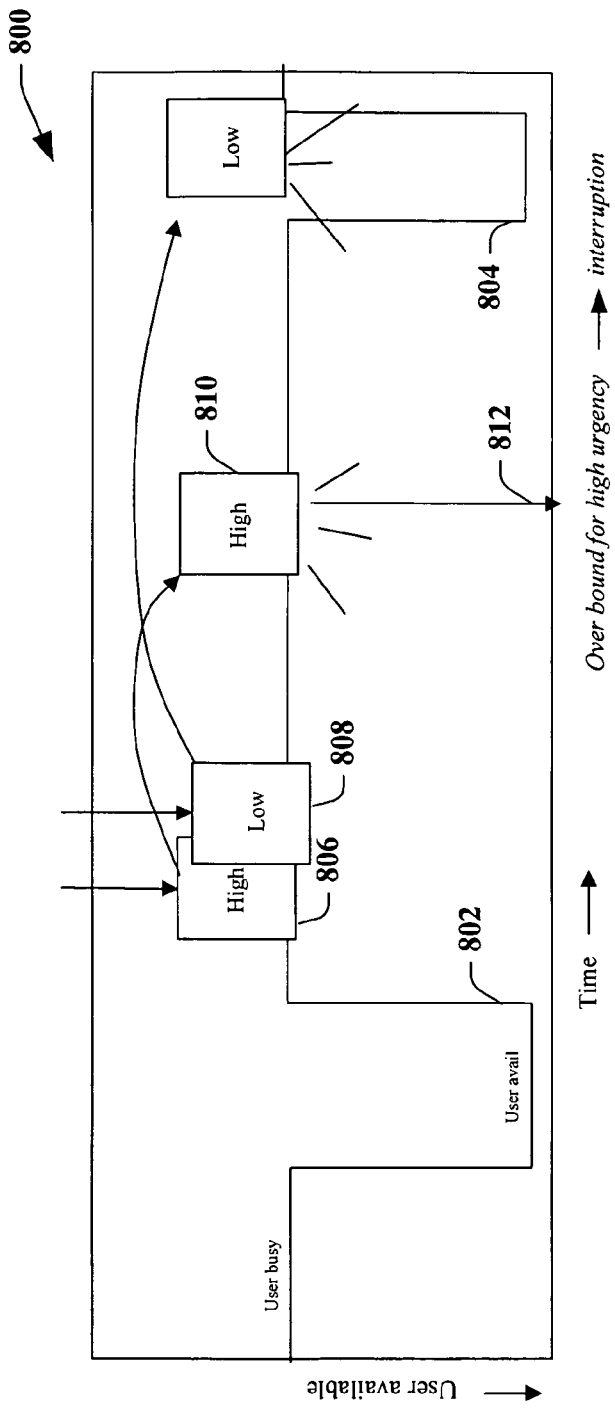
FIG. 8 illustrates bounded deferral policies.

FIG. 8 illustrates bounded deferral policies that can be utilized in connection with the analyzer 700 (FIG. 7). According to this aspect, notifications or messages are not typically delivered until an available free state is reached unless a time bound or optimal deferral period is detected and determined. For example, free states are illustrated at references 802 and 804. During busy states of the user (depicted as opposite to the free states 802, 804) a high and low priority message 806 and 808 are queued by a notification agent or manager (not shown). At 810, a time bound that was set as a max deferral time is reached for the high priority message and thus the high priority message is delivered to the user at 812. The low priority message 808 does not reach a time bound in the illustrated example of FIG. 8. Thus, the low priority message is not delivered until the next available free state at 804. In this manner, disruptiveness of notifications received by the user is mitigated. It is noted, that the time bounds can be influenced by the users context such as workload, number of messages received, and the time dependency of the notification content.

On average, because of the typical smatter of "likely available" states during typical desktop or endpoint device activities, most notifications will tend to be delivered before the max deferral times. However, user's will be more pleased on average with the notification system as notifications will tend more so to occur when the user is free than they would have been had notifications simply been passed through when notifications are received. The probability that a free state will be reached generally increases with time—as there are more opportunities for detecting a likely available state with increasing amounts of time. As the probability of a likely free state increases with increasing amounts of times, lower priority messages will tend to occur with higher-likelihood during these likely free states, and the probability of being disrupted will grow with the increasing priority of the messages.

Figure 9:
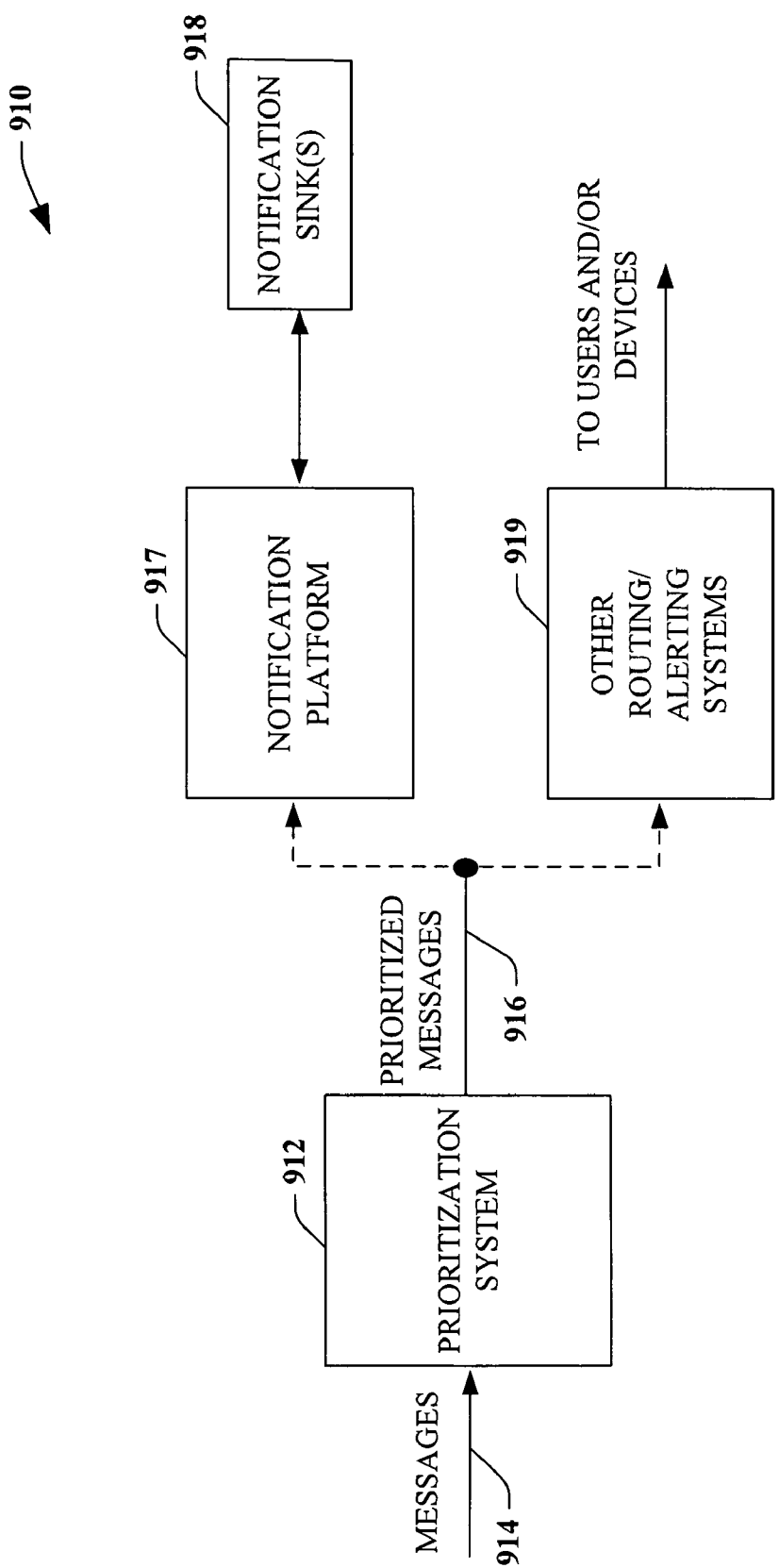
FIG. 9 illustrates an example prioritization and notification system.

FIG. 9 illustrates an example prioritization and notification system. A system 910 illustrates a prioritization system 912 and notification architecture. The prioritization system 912 receives one or more messages or notifications 914, generates a priority or measure of importance (e.g., probability value that the message is of a high or low importance) for the associated message, and provides the one or more messages with an associated priority value at an output 916. Classifiers can be constructed and trained to automatically assign measures of prioritization to the messages 914. For example, the output 916 can be formatted such that messages are assigned a probability that the message belongs in a category of high, medium, low or other degree category of importance.

The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

In another example, a notification platform 917 can be employed in conjunction with the prioritization system 912 to direct prioritized messages to one or more notification sinks accessible to users. The notification platform 917 can be adapted to receive the prioritized messages 916 and make decisions regarding when, where, and how to notify the user, for example. As an example, the notification platform 917 can determine a communications modality (e.g., current notification sink 918 of the user such as a cell phone, communications session to display, or Personal Digital Assistant (PDA)) and likely location and/or likely focus of attention of the user. If a high importance e-mail were received, for example, the notification platform 917 can determine the user's location/focus and direct/reformat the message to the notification sink 918 associated with the user. If a lower priority message 916 were received, the notification platform 917 can be configured to leave the e-mail in the user's in-box for later review as desired, for example.

Figure 10:
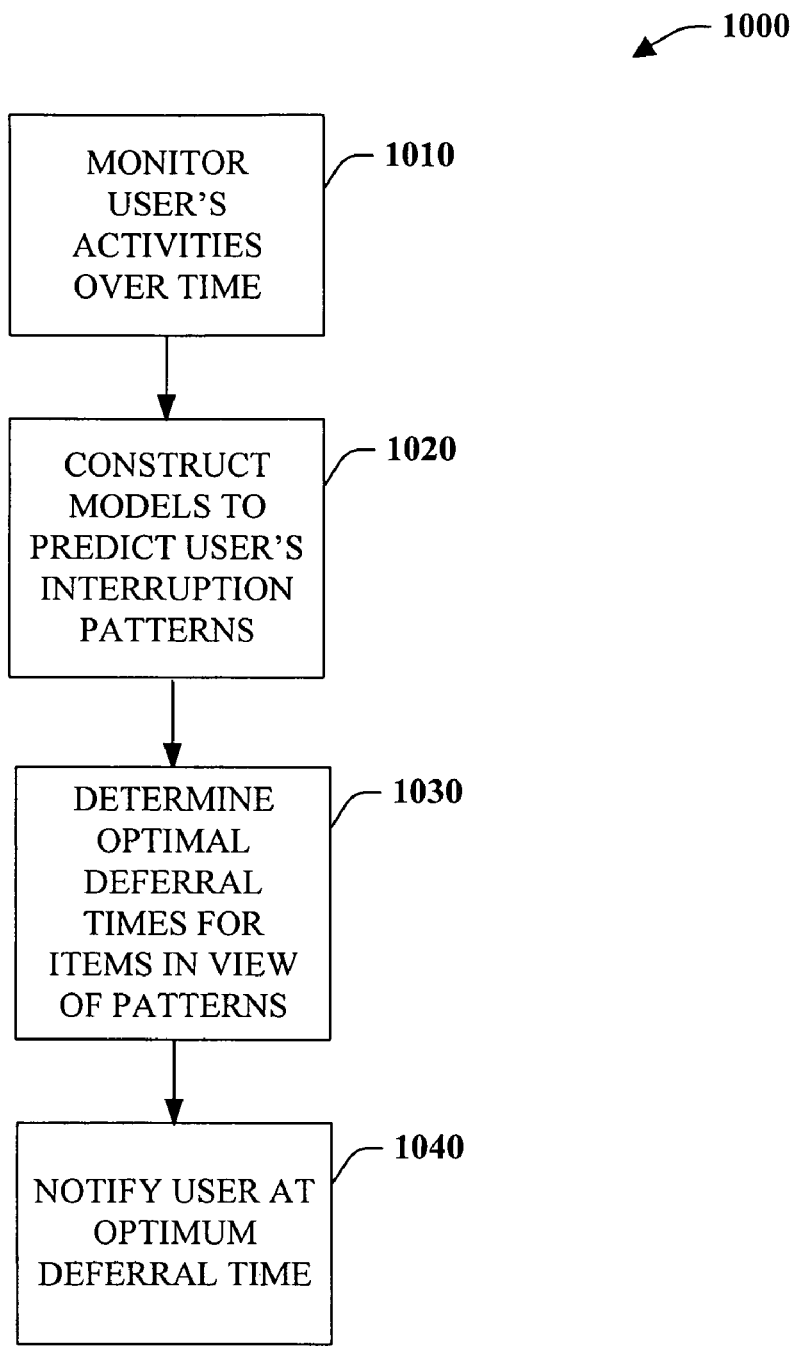
FIG. 10 is a flow diagram illustrating a process for deferring items.

FIG. 10 illustrates a process 1000 for deferring items. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Proceeding to 1010, a user's (or user group) activities are monitored over time. As noted above, this can include recording busyness data overtime from local and/or remote sources. Such data can include applications activity, communications activity, and data notations indicating lower periods of activities such as during lunch breaks when the user is generally free to peruse messages or other type information. At 1020, models are constructed to predict user's future interruption patterns such as if they are in a high, medium, or low cost of interruption period. As previously noted, such models can include policy components, alerting and cost models, priorities models, bounded-deferral models, and/or other type models. At 1030, optimal deferral times for a given interrupt are determined in view of the user's current state as determined by the models. This includes deferring a message or other item until a user is in a state to properly process the message. This generally includes balancing the cost of interrupting the user versus the loss in value of delaying a respective message. At 1040, users are notified of a pending interrupt or item at the optimal deferral period. As can be appreciated, a plurality of items can be analyzed and delivered to the user in accordance with the loss of value principles described above and the user's predicted state of busyness.

Figure 11:
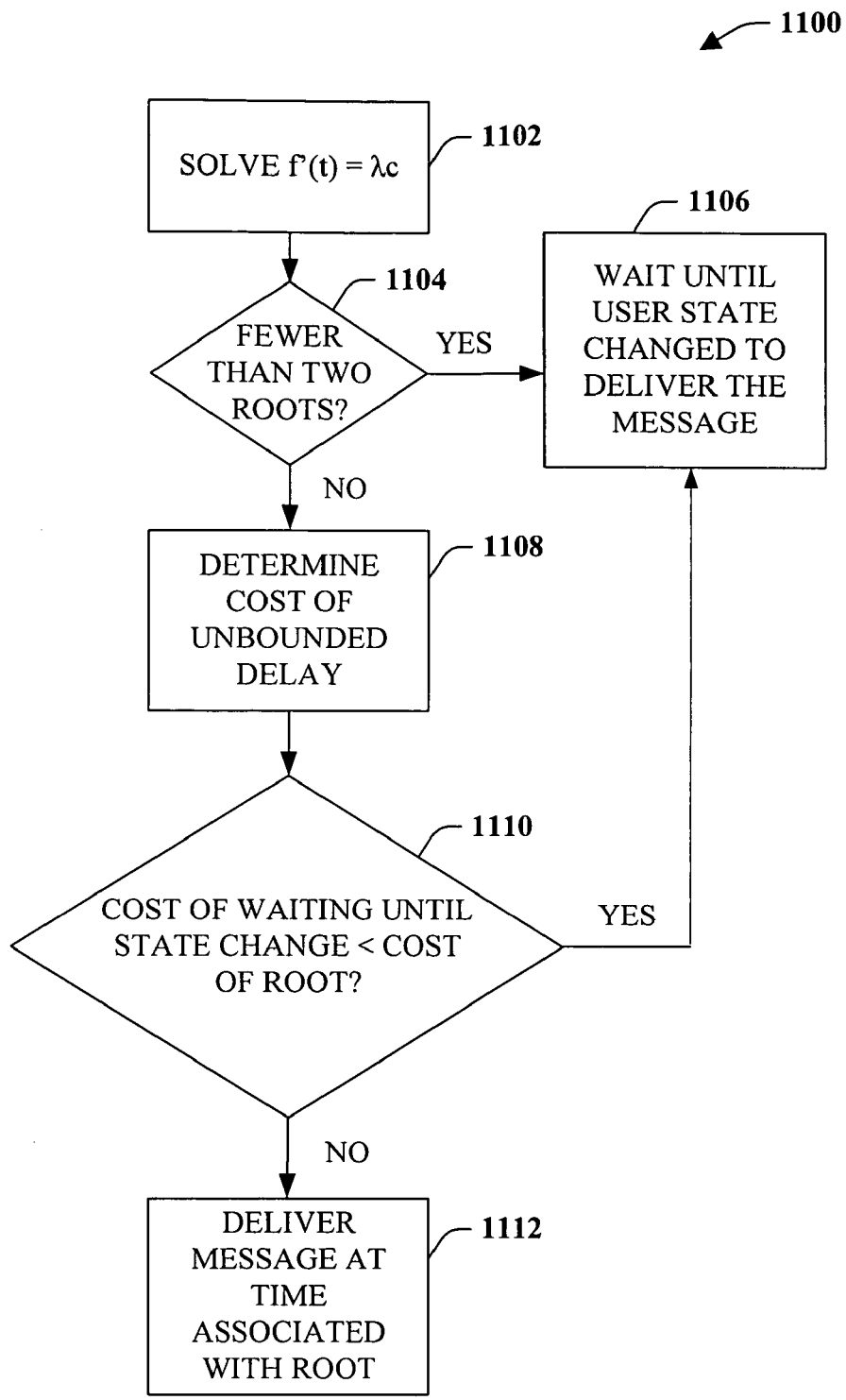
FIG. 11 is a flow diagram illustrating a process for determining a deferral policy.

Now turning to FIG. 11, a methodology 1100 for determining when to interrupt a user is illustrated. The variables and symbols within the equation are defined above and described with respect to FIG. 1. At 1102, the algorithm $f'(t)=\lambda c$ is solved to determine whether roots exist. At 1104, a determination is made regarding whether there are fewer than two roots associated with such algorithm. If there are fewer than two roots, then at 1106 a message is delivered after a change in user state is determined (e.g., a bounded deferral is not enacted with respect to the message). If there are more than two roots, then at 1108 a cost of unbounded delay is calculated. For instance, the algorithm $W_\infty = \int_0^\infty \lambda e^{-\lambda s} f(s) ds$ can be utilized to calculate a measure of cost with respect to unbounded delay.

At 1110, a comparison is made between the cost of unbounded delay and the cost associated with a root, and if the cost of unbounded delay is less than the cost associated with the root the methodology proceeds to act 1106 (described above). If cost associated with the root is less than the cost of unbounded delay, then at 1112 the message can be delivered at a time associated with the root. Furthermore, it is understood that if there are numerous roots, each of such roots can be analyzed and a cost associated therewith can be calculated. The root associated with the lowest cost is the global minimum, and can be subject to the comparison with the cost of unbounded delay.

It can be noted that the sample analysis described above can be taken to be approximate because it is myopic—the analysis provides an ideal deferral time at the time of an initial analysis. Accordingly, the methods described herein can be applied iteratively at multiple times, with the progression of time. More global analyses can also be developed. For example global analyses are feasible for families of bounded deferral problems where functional forms representing the loss of value of information with delays and the likelihood of becoming free are unchanging. Such a family of problems includes cases where the loss of value of information with delays is constant with time, and the probability distribution describing the likelihood that a user who is currently busy will become free is a memoryless probability distribution.

Figure 12:
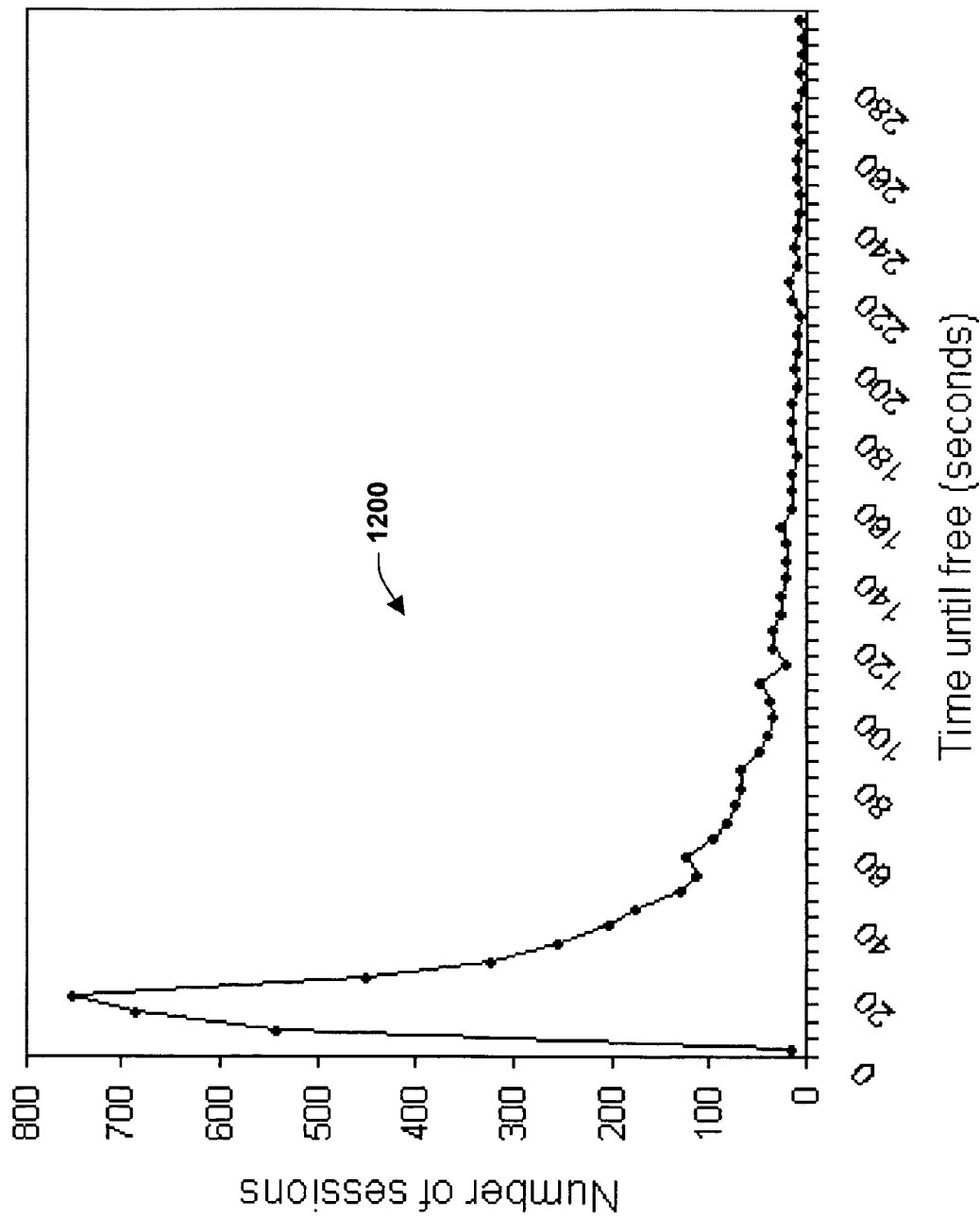
FIG. 12 is a graph illustrating results of a study involving several individuals.
Figure 13:
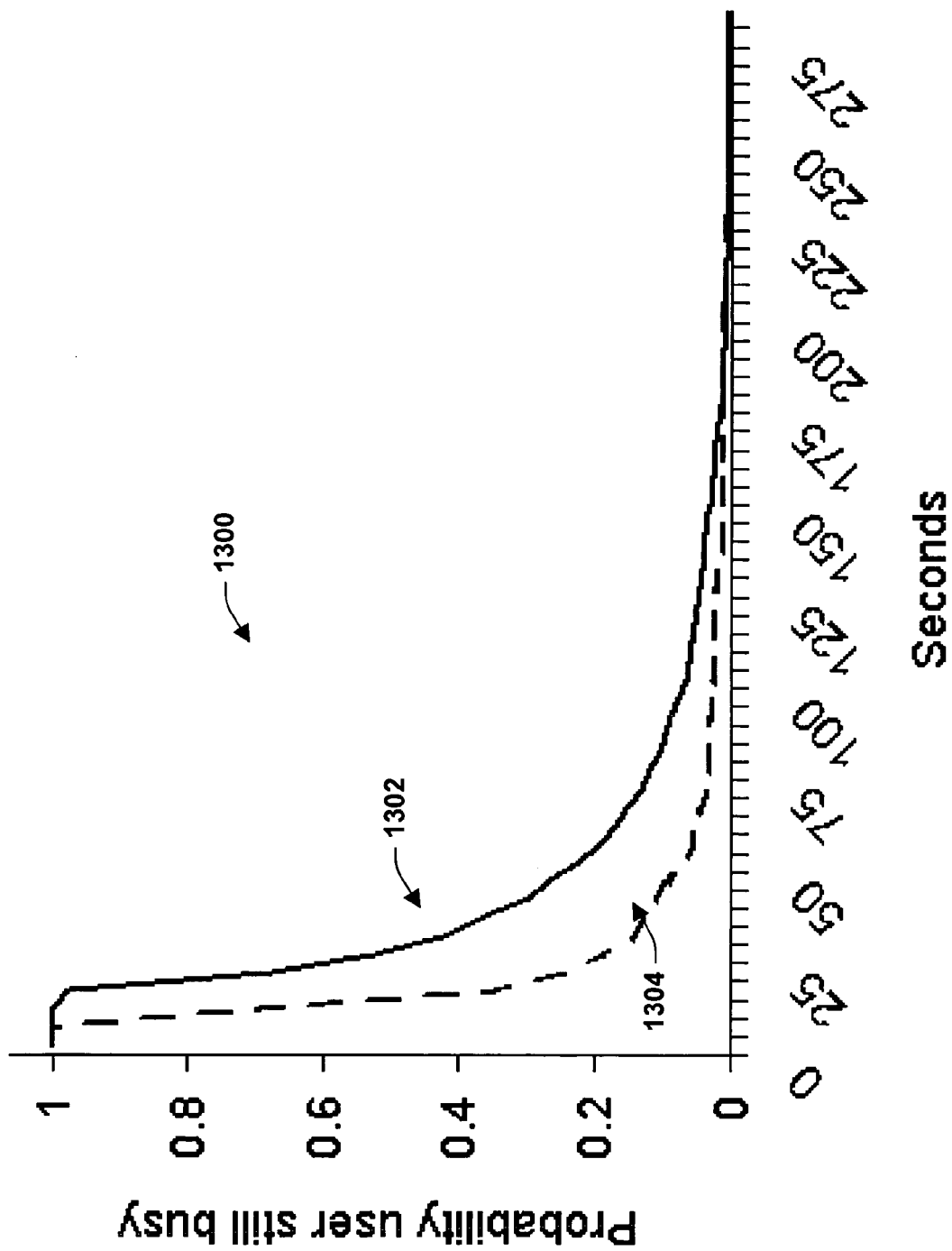
FIG. 13 is a graph illustrating probability distributions of two disparate users.

Referring briefly to FIG. 12, a graph 1200 illustrating results of a study involving several individuals is illustrated. The individuals participating in the study defined (with rules) when they were busy versus when they were available. The graph 1200 illustrates a number of sessions where busyness lasted different amounts of time (e.g., between the time a user became busy and free). From a single user, this information can be normalized into a probability distribution. Now referring to FIG. 13, a graph 1300 illustrating probability distributions of two disparate users is illustrated. The graph 1300 depicts a number of sessions normalized to 100%, which can thus be viewed as probability distributions 1302 and 1304 over when transitions will occur between busy and free for two disparate individuals, respectively. In other words, the probability distributions 1302 and 1304 represent a probability that two users are still busy given that they were busy at time 0 (zero) as time goes forward.

Figure 14:
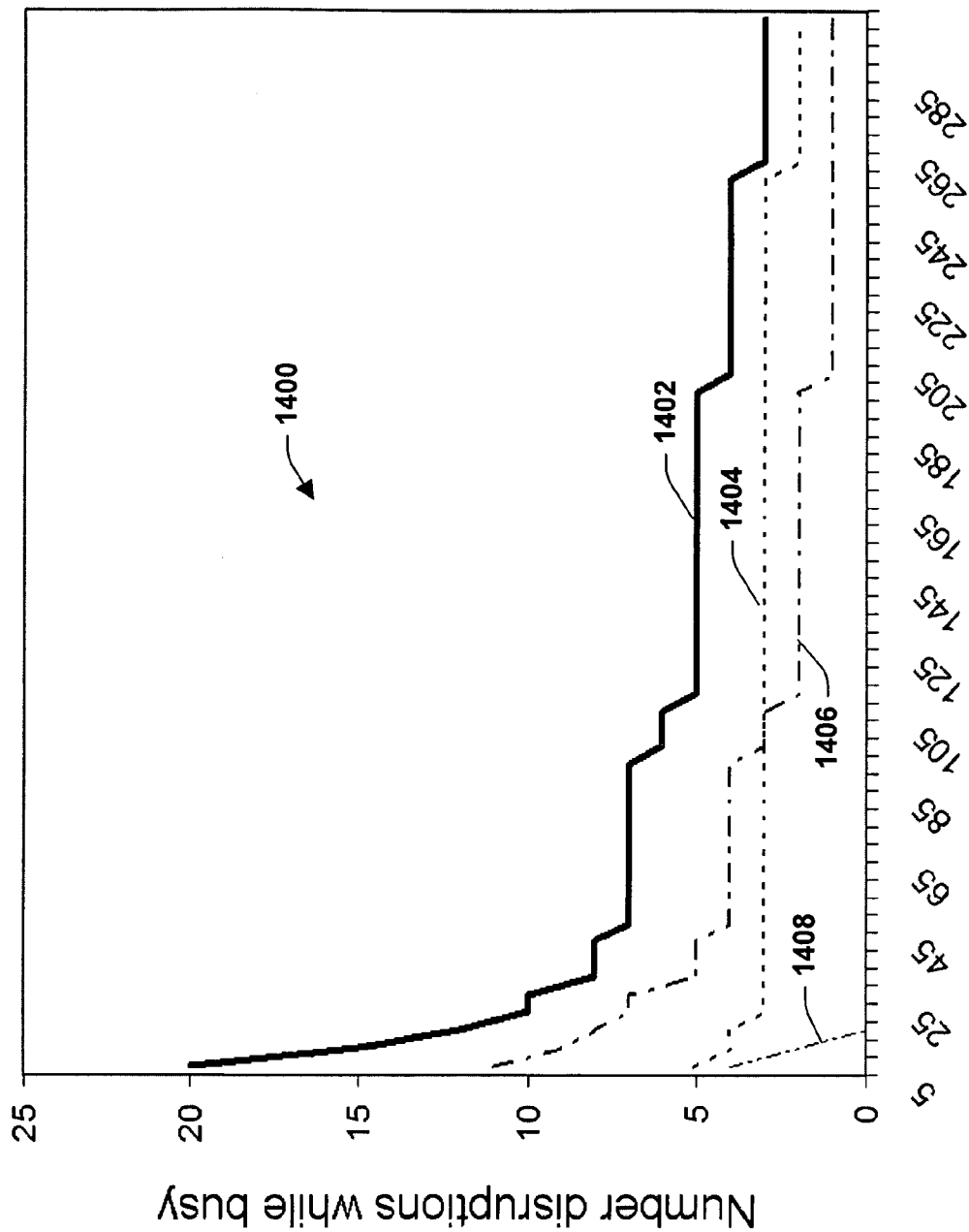
FIG. 14 is a graph illustrating disruptions for incoming information items while a user is busy.
Figure 15:
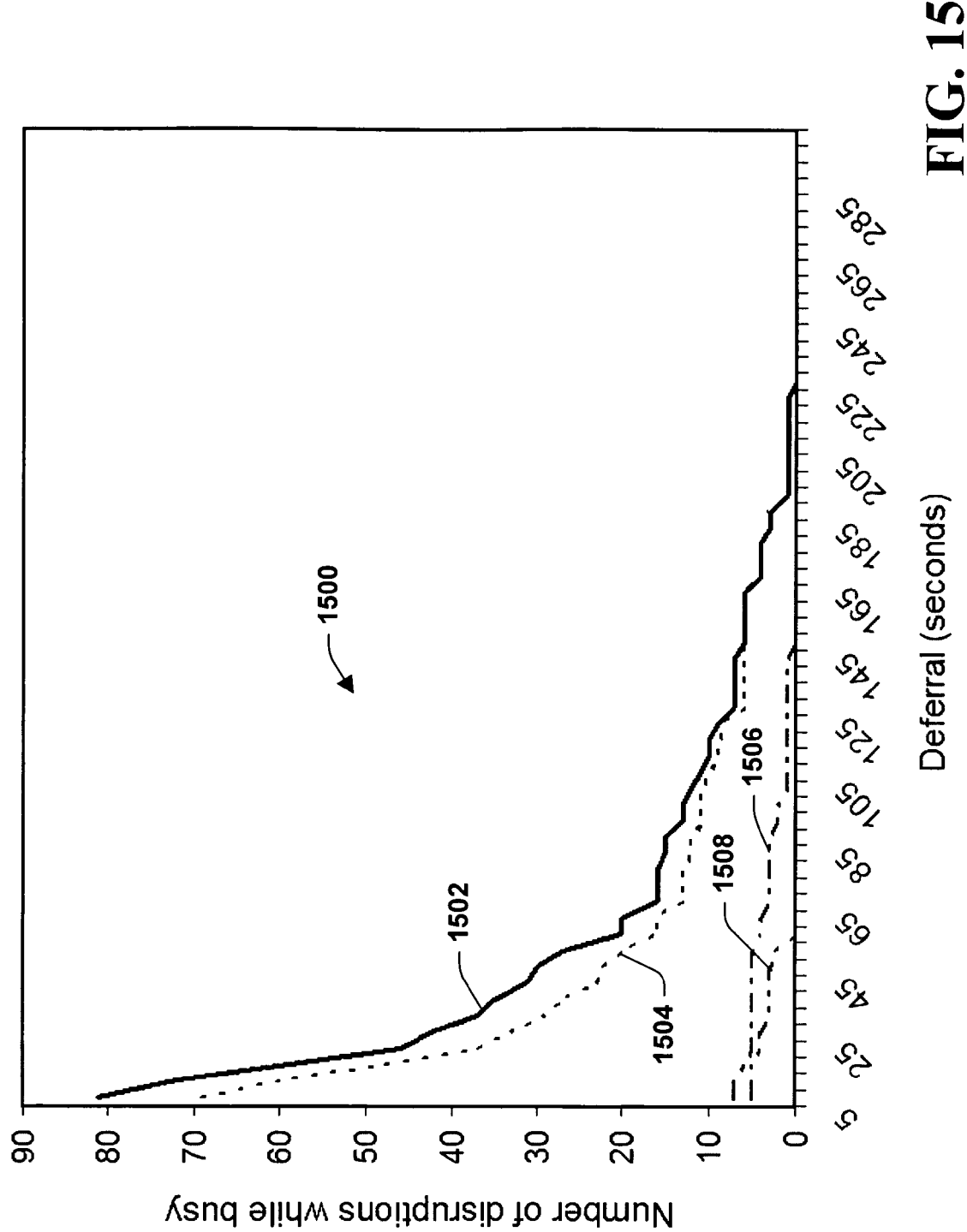
FIG. 15 is a graph illustrating disruptions for incoming information items while a user is busy.

Turning now collectively to FIGS. 14 and 15, graphs 1400 and 1500 that represent a number of disruptions for incoming messages during busy states are illustrated as a function of increasing amounts of deferral for two disparate participants. In more detail, graph 1400 represents a number of disruptions for a first user and graph 1500 represents a number of disruptions for a second user. Solid lines 1402 and 1502, respectively, represent diminishment of alerts during busy times with increasing deferral times for all incoming information items (e.g., emails). The dashed or broken curves 1404, 1406, 1408, and 1504, 1506, and 1508, respectively, represent a number of alerts associated with arrival of information items assigned high, medium, and low urgency scores (e.g., by a classifier or other suitable learning system/method). One or more advantages of a bounded deferral system/method can be gleaned upon analyzing the graphs 1400 and 1500. For instance, a small amount of deferral (e.g., four minutes) is shown in graph 1400 to lead to a diminishment of alerts during busy times from twenty alerts to four alerts for the first user. Similarly, a bounded deferral time is shown in graph 1500 to lead to diminishment of alerts during busy times from eight alerts to zero alerts for the second user.

The curves 1404, 1406, 1408 and 1504, 1506, and 1508 that represent alerts during busy times for information items segmented automatically into different classes of urgency highlight a value of providing users with an ability to differentially set maximal deferrals for disparate types of information items (e.g., emails, telephone messages, . . . ). For instance, with respect to the second user, a deferral of slightly more than one minute for information items classified as high urgency would suppress all alerts by important information items during busy times with only a small delay in transmission of information to the second user. A three minute deferral for the second user would suppress all medium urgency alerts, and a delay of transmitting low urgency information items of four minutes would suppress all low-urgency information items for a likely tolerable wait to view such information items. It is understood that the empirical data shown in graphs 1400 and 1500 represent a worst-case scenario, as duration of busy states are defined as a time that the user becomes busy. Value of bounded deferral may increase for real-world situations, as messages are not constrained to arrive at beginning of busy states—instead, messages can arrive at any time during a busy situation. Messages arriving at times later than a start of a busy situation would be withheld from a user for the bounded deferral or until an alteration in user state.

Figure 16:
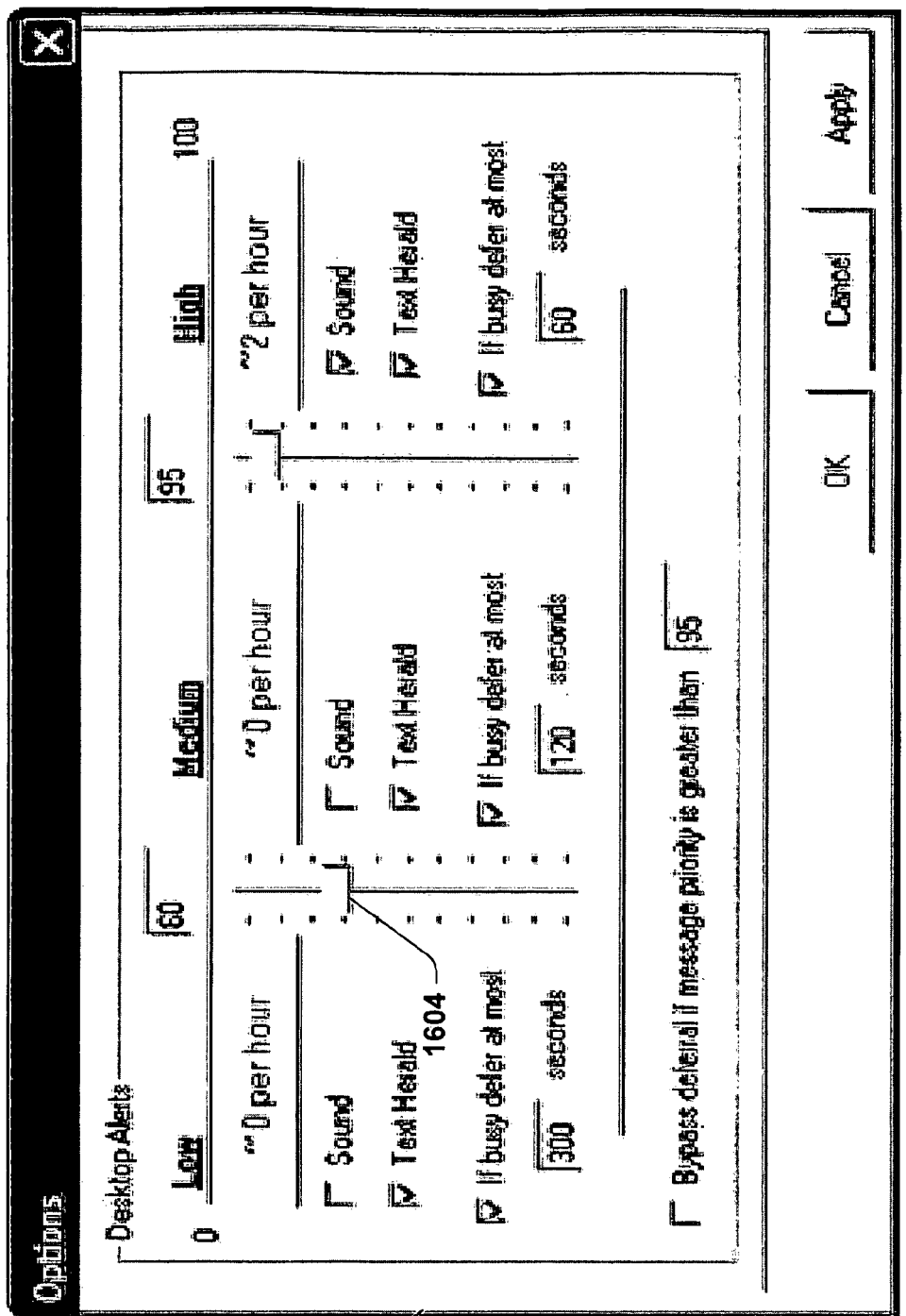
FIG. 16 is an exemplary user interface.

Now turning to FIG. 16, a screenshot 1600 illustrating an exemplary user interface 1602 that can be employed in connection with the claimed subject matter is illustrated. The user interface 1602 enables a user to define an information item (e.g., email) as low, medium, and high urgency. Further, the user interface 1602 provides controls for defining deferral policies for disparate classes of information items. The user interface 1602 can include one or more sliders 1604 that enable a user to describe how urgency scores are mapped to disparate classes of information items. Furthermore, a user can alter a manner in which alerts are rendered or suppress alerting completely for disparate classes via the user interface 1602. In still more detail, for each defined class of information item, a user can assign a maximal deferral time as well as specify an urgency score that bypasses a deferral system. When an information item arrives, if a user is associated with a busy state until the deferral time, an alert relating to the information item can be provided to the user at the maximal deferral time.

Figure 17:
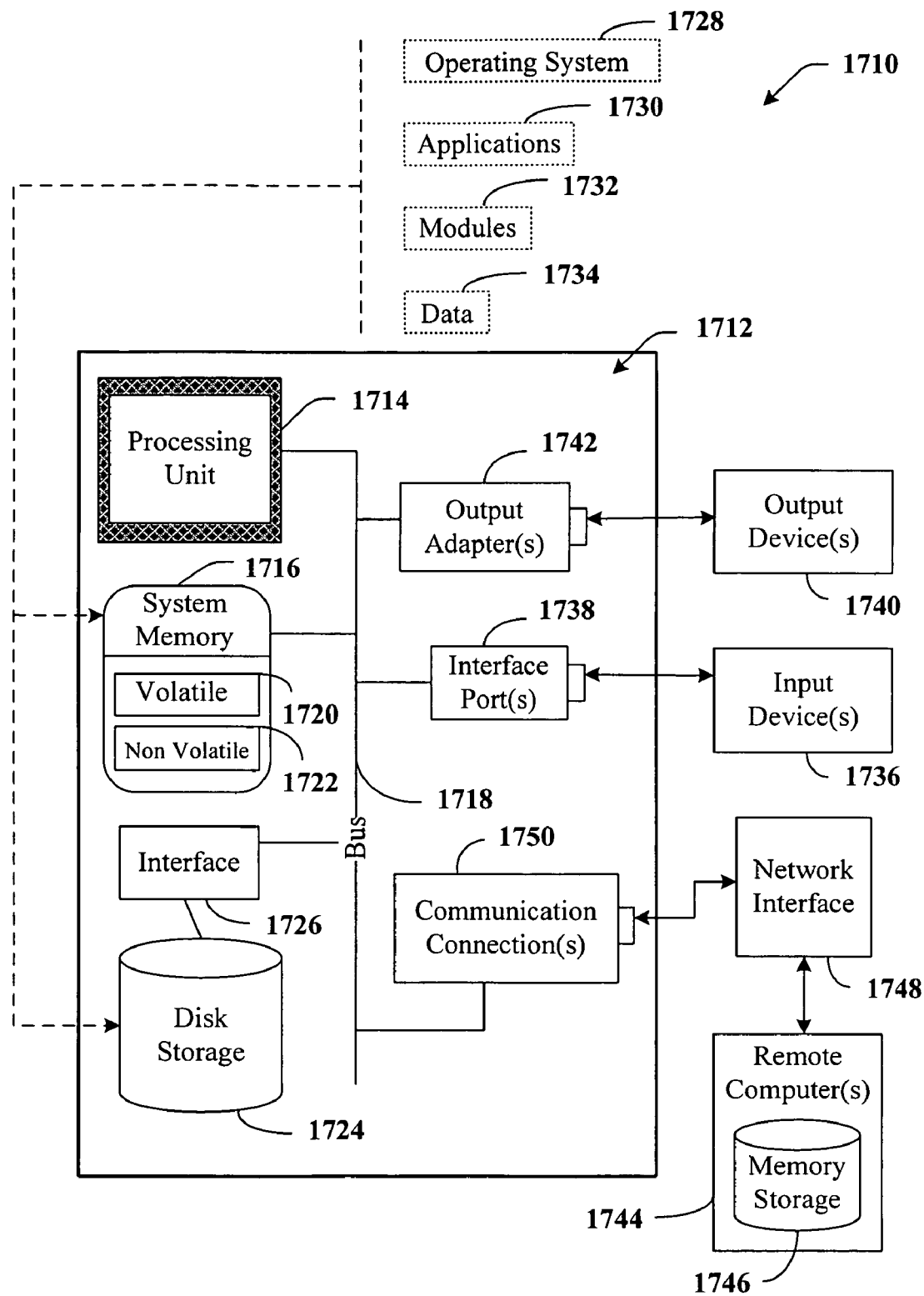
FIG. 17 is a schematic block diagram illustrating a suitable operating environment that can be utilized in connection with determining deferral times.

With reference to FIG. 17, an exemplary environment 1710 for implementing various aspects of the claimed subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the claimed subject matter can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers, among other output devices 1740, that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 18:
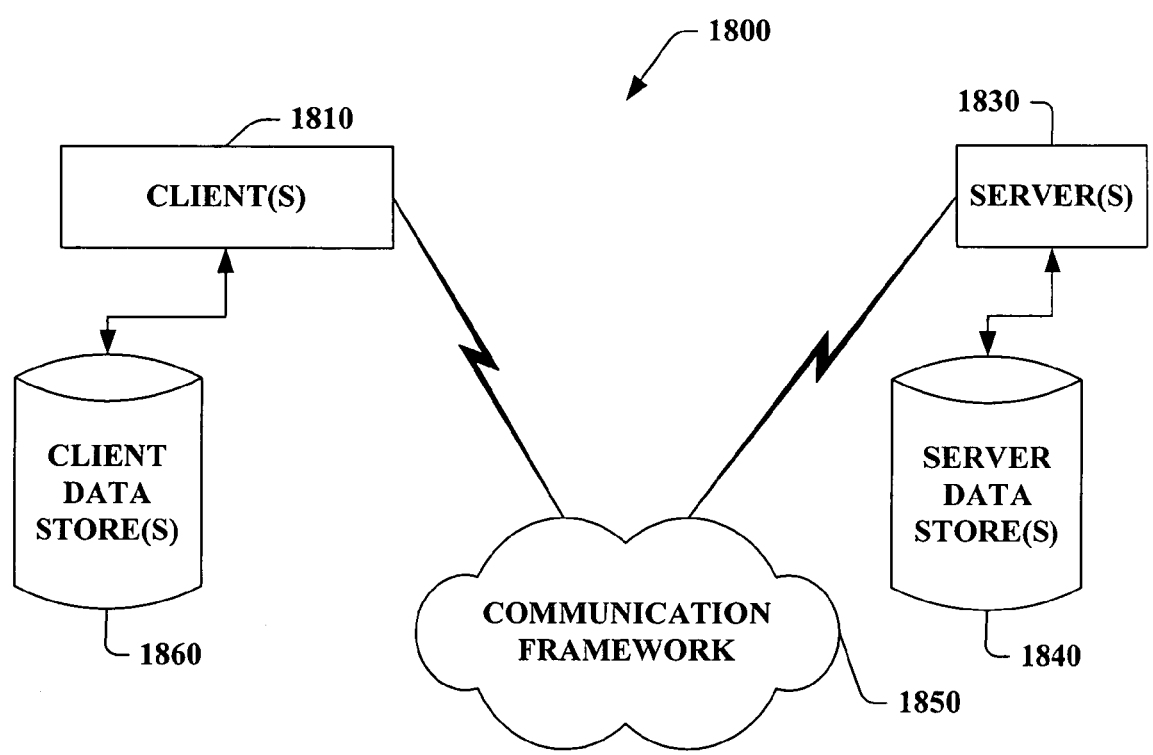
FIG. 18 is a schematic block diagram of a sample-computing environment with which aspects described herein can interact.

FIG. 18 is a schematic block diagram of a sample-computing environment 1800 with which the claimed subject matter can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing one or more aspects described herein, for example. One possible communication between a client 1810 and a server 1830 may be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates information processing, comprising:
   a processor; and
   a memory, communicatively coupled to the processor, having stored thereon at least one component comprising:
   an analyzer that automatically determines a user's availability based at least in part upon patterns of the user's interruptability; and
   a deferral component that determines a bounded deferral period at the end of which to deliver an information item to the user in accordance with the user's availability, wherein a maximal deferral time is determined based at least in part on one or more of an exact or approximate minimization of a net expected cost to the user both of delay and of interruption, the net expected cost of delay and the net expected cost of interruption scaled to a substantially similar scale, the maximal deferral time, t, being determined via one of an ideal or approximate minimization of the following formula:

$$W(t)=(c+f(t))g(t)+\int_0^t -g'(s)f(s)ds,$$

where W(t) is a total expected cost; g(t) describes a probability that the user will be busy after waiting up until the maximal deferral time t; $f(t)$ is a loss in the value of seeing the information item, relative to an initial value of reviewing the information item when it arrives, when reviewing the information item at the maximal deferral time t; $f(s)$ is a loss of value of the information item at time s that the user might become available before the maximal deferral time t under uncertainty; and c is a cost of interruption if the user is busy.

2. The system of claim 1, further comprising a log that records interruption patterns of the user over time, the log recording data from local and/or remote network locations, and the interruption patterns including patterns of availability, unavailability, busyness, application activity, user activity, subject matter being worked on, type or numbers of tasks processed, times of busyness, and times when email or voice mail are processed.

3. The system of claim 2, wherein the analyzer processes data from a database via one or more models that are employed to determine and predict user busyness states including when the cost to interrupt the user would be lower versus periods of higher cost when the user is focused on other tasks.

4. The system of claim 1, wherein the deferral component processes interrupts to the user and determines at least one of optimal and approximately optimal deferral times in which to direct the information item to the user, the information item being one of an email message, a phone message, an instant message, an alert, and a task from another application.

5. The system of claim 1, wherein the analyzer at least one of couples alerting and cost models for when to make a particular interruption of the user with considerations of the user's current workload and applies decision-theoretic components to weigh cost of interrupting the user versus benefits of notifying the user at a given time.

6. The system of claim 1, wherein the analyzer applies bounded deferral policies to decide whether to notify users of interruptions that are potential candidates for gaining the user's attention in the present or near future.

7. The system of claim 1, wherein the analyzer employs models that learn patterns including one or more of the user's interests, the user's attention modes at given times, and the user's preference for a particular type of message.

8. The system of claim 7, wherein the models include at least one of Hidden Markov Models, Bayesian networks and other probabilistic graphical models, naïve Bayesian classifiers, Support Vector Machines (SVMs), neural networks, and logical rules models.

9. The system of claim 8, wherein the models receive data from one or more of a plurality of local and remote data sources including at least one of a cell phone, a microphone, a Global Positioning System (GPS), an electronic calendar, a vision monitoring system, a desktop computer, and a web site.

10. The system of claim 1, wherein the analyzer calculates a first measure of cost associated with delaying deliverance of the information item until the user's availability is changed.

11. The system of claim 10, wherein the deferral component compares the first measure of cost with a second measure of cost associated with cost of delaying deliverance of the information item at a specified time and delivers the information item to the user based at least in part upon the comparison.

12. A method that facilitates sending notifications to a user, comprising:
    utilizing a first computer system to monitor the user's activities over time;
    utilizing a second computer system to construct at least one model from the activities to determine a predicted busyness state for the user; and
    utilizing a third computer system to automatically defer a received information item based at least in part on the predicted busyness state of the user and a cost model, wherein a maximal deferral time is determined based at least in part on one or more of an exact or approximate minimization of a net expected cost to the user both of delay and of interruption, the net expected cost of delay and the net expected cost of interruption scaled to a substantially similar scale, the maximal deferral time, t, being determined via one of an ideal or approximate minimization of the following formula:

$$W(t)=(c+f(t))g(t)+\int_0^t -g'(s)f(s)ds,$$

where W(t) is a total expected cost; g(t) describes a probability that the user will be busy after waiting up until the maximal deferral time t; $f(t)$ is a loss in the value of seeing the information item, relative to an initial value of reviewing the information item when it arrives, when reviewing the information item at the maximal deferral time t; $f(s)$ is a loss of value of the information item at time s that the user might become available before the maximal deferral time t under uncertainty; and c is a cost of interruption if the user is busy;
    wherein the first, second, and third computer systems may be the same or separate computer systems.

13. The method of claim 12, further comprising constructing at least one of a priorities model, a policy model, a bounded-deferral model, and a derivative model to determine the predicted busyness state for the user.

14. The method of claim 12, further comprising analyzing at least one of a session input, an attentional load factor, a user status, a threshold control, and a preference setting to determine the predicted busyness state of the user.

15. The method of claim 12, further comprising deferring interruption of the user with at least one of potentially time urgent messages, inquiries, and communications, including at least one of the relay of email messaging, instant messaging, alerts, incoming telephone calls, utterances sent via a push-to-talk communication system, error messages, inquiries to the user from autonomous systems, and advice to the user from autonomous systems.

* * * * *